United States Patent
Takebe et al.

(10) Patent No.: US 8,361,264 B2
(45) Date of Patent: Jan. 29, 2013

(54) PROCESS FOR PRODUCING POLARIZING PLATE, POLARIZING PLATE PRODUCED BY THE PROCESS, AND LIQUID CRYSTAL DISPLAY DEVICE USING THE POLARIZING PLATE

(75) Inventors: Takashi Takebe, Tokyo (JP); Masataka Takimoto, Tokyo (JP); Nobuo Kubo, Tokyo (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 13/203,669

(22) PCT Filed: Feb. 1, 2010

(86) PCT No.: PCT/JP2010/051337
§ 371 (c)(1),
(2), (4) Date: Aug. 26, 2011

(87) PCT Pub. No.: WO2010/100986
PCT Pub. Date: Sep. 10, 2010

(65) Prior Publication Data
US 2011/0308712 A1     Dec. 22, 2011

(30) Foreign Application Priority Data

Mar. 6, 2009   (JP) ................................. 2009-053255

(51) Int. Cl.
*B32B 38/18* (2006.01)
*B32B 37/00* (2006.01)
*B29C 65/00* (2006.01)

(52) U.S. Cl. .......... 156/229; 156/160; 156/264
(58) Field of Classification Search .......... 156/229, 156/160, 264; B32B 38/18, 37/00; B29C 65/00
See application file for complete search history.

(56) References Cited

U.S. PATENT DOCUMENTS

| | | | |
|---|---|---|---|
| 7,929,088 B2 * | 4/2011 | Lyu et al. | 349/119 |
| 2006/0202366 A1 * | 9/2006 | Murakami et al. | 264/1.7 |
| 2008/0099128 A1 * | 5/2008 | Yamada et al. | 156/152 |

FOREIGN PATENT DOCUMENTS

| | | |
|---|---|---|
| JP | 05-119217 | 5/1993 |
| JP | 2007-231157 | 9/2007 |
| JP | 2008-088417 | 4/2008 |
| WO | 2006/112207 | 10/2006 |

* cited by examiner

*Primary Examiner* — Philip Tucker
*Assistant Examiner* — Shawn F Hogan
(74) *Attorney, Agent, or Firm* — Lucas & Mercanti, LLP

(57) ABSTRACT

Disclosed is a process for producing a polarizing plate which is transparent, has resistance against high temperatures and high humidity, and is significantly improved in brittleness. Specifically disclosed is a process for producing a polarizing plate comprising two polarizing plate protective films and a polarizer intercalated between the polarizing plate protective films, which is characterized in that at least one of the two polarizing plate protective films is an acrylic film comprising an acrylic resin (A) and a cellulose ester resin (B) at a ratio of 85:15 to 55:45 by mass, and the acrylic film is drawn in at least one direction at a draw ratio of 10 to 150% inclusive and is subsequently bonded to the polarizer with an aqueous adhesive agent.

10 Claims, No Drawings

US 8,361,264 B2

PROCESS FOR PRODUCING POLARIZING PLATE, POLARIZING PLATE PRODUCED BY THE PROCESS, AND LIQUID CRYSTAL DISPLAY DEVICE USING THE POLARIZING PLATE

CROSS REFERENCE TO RELATED APPLICATION

This is a 371 of PCT/JP2010/051337 filed Feb. 1, 2010, which in turn claimed the priority of Japanese Patent Application No. 2009-053255 filed Mar. 6, 2009, both applications are incorporated by reference herein.

TECHNICAL HELD

The present invention relates to a production method of a polarizing plate enhanced in terms of saponification treatment adaptability, more specifically, to a polarizing plate protective film composed of an acrylic film which is excellent in transparency, has durability for high temperature and high moisture, and is improved remarkably in term of brittleness.

BACKGROUND ART

Demand for liquid crystal displays expands due to application for liquid crystal displays of liquid crystal televisions, personal computers, and the like. Usually, a liquid crystal display device is composed of a liquid crystal cell in which a transparent electrode, a liquid crystal layer, a light filter, and the like are sandwiched between glass plates and tow two polarizing plates provided at both sides of the liquid crystal cell. Each of the polarizing plates has a structure that a polarizer (also referred to as polarizing layer or polarizing film) is sandwiched between two polarizing plate protective films. Usually, as this polarizing plate protective film, a cellulose triacetate film is used.

On the other hand, technical progress in recent years accelerates a trend to enlarge the size of a liquid crystal display, and also diversifies the application of liquid crystal displays. For example, the application include utilization for large size displays installed in streets and shops and utilization for advertisement displays employing a display device called a digital signage installed in public places.

In such an application, since liquid crystal displays may be utilized at the outdoors, deterioration of polarizer due to high temperature quantity and high humidity becomes problems. Accordingly, polarizing plate protective films are required to have durability for high temperature quantity and high humidity. However, from conventional cellulose ester film such as cellulose triacetate film, it becomes difficult to obtain durability for high temperature quantity and high humidity.

On the other hand, polymethylmethacrylate (hereafter, abbreviated as PMMA) which is the representative of an acrylic resin exhibits excellent transparency and dimension stability as well as low moisture absorption, it is used suitably for a polarizing plate protective film.

However, the PMMA film is poor in heat resistance and causes problems of deformation during use under high temperature or during use for a long period of time. Further, as compared with cellulose ester film and the like, since acrylic film breaks easily and is brittle, handling of the acrylic film becomes difficult, and especially it is difficult to use the acrylic film to produce a polarizing plate protective film for use in a large size liquid crystal display device.

With reference to the above-mentioned problems, in order to improve moisture resistance and heat resistance, Patent document 1 proposes a technique to add polycarbonate (hereafter, abbreviated as PC) to an acrylic resin. However, since usable solvent is restricted, and compatibility between these resins is not sufficient, the mixture of these resins tends to cause cloudy. Therefore, it is difficult to use the mixture of these resins for a polarizing plate protective film.

Further, Patent document 2 proposes an optical film composed of a resin composite formed by blending an acrylic resin and a cellulosic.

The optical film made of this blended resin composite is a polarizing plate protective film which is good in transparency, has durability for high temperature and high humidity, and is excellent in brittleness. However, with the simple mixture of them, the resultant film is poor in saponification adaptability. Therefore, in order to paste the film onto a polarizer, it is necessary to use a special adhesive different from a polyvinyl alcohol type water-base adhesive used for a cellulose ester film being an ordinary polarizing plate protective film.

RELATED-ART DOCUMENT

Patent Document

Patent document 1: Japanese Unexamined Patent Publication No. 5-306344, official report
Patent document 2: Japanese Unexamined Patent Publication No. 2008-88417, official report

SUMMARY OF INVENTION

Problems to be Solved by the Invention

Therefore, the present invention is accomplished in view of the above-mentioned problems, its object is to provide a production method of a polarizing plate whose saponification adaptability is improved, in a production method of a polarizing plate which has a polarizing plate protective film which is transparent, has durability for high temperature and high humidity and is excellent in brittleness.

Means for Solving the Problems

The above object of the present invention can be attained by the following structures.
1. In a production method for a polarizing plate composed of a polarizer and two sheets of polarizing plate protective films sandwiching the polarizer, wherein at least one sheet of the two sheets of polarizing plate protective films is an acrylic film which contains an acrylic resin (A) and a cellulose ester resin (B) at a content ratio of 85:15 to 55:45, and the acrylic film is stretched in at least one direction by 10% or more and 150% or less, and thereafter passed on the polarizer by use of a water-based adhesive.
2. The production method for a polarizing plate, described in 1, characterized in that the acrylic film contains a polyhydric alcohol fatty acid ester in an amount of 0.1 to 10 percent by weight to the total weight of the acrylic film.
3. A polarizing plate characterized by being produced by the production method for a polarizing plate, described in 1 or 2.
4. A liquid crystal display device characterized by using the polarizing plate described in 3.

Effect of the Invention

According to the present invention, it is possible to provide a production method for a polarizing plate which is transparent, high temperature resistant and high moisture resistant, and is improved in terms of brittleness.

Especially, it is possible to provide a polarizing plate for use in a large-sized liquid crystal display and a liquid crystal display for digital sign.

EMBODIMENT FOR CARRYING OUT THE INVENTION

In a production method for a polarizing plate composed of a polarizer and two sheets of polarizing plate protective films sandwiching the polarizer, wherein at least one sheet of the two sheets of polarizing plate protective films is an acrylic film which contains an acrylic resin (A) and a cellulose ester resin (B) at a content ratio of 85:15 to 55:45, and the acrylic film is stretched in at least one direction by 10% or more and 150% or less, and thereafter passed on the polarizer by use of a water-based adhesive.

[Acrylic Film]

The acrylic film of the present invention is acrylic film contains an acrylic resin (A) and a cellulose ester resin (B) at a content ratio of 85:15 to 55:45.

<Acrylic Resin (A)>

Acrylic resins employed in the present invention include methacrylic resins. These resins are not particularly limited, and preferred resins include those which are composed of methyl methacrylate units of 50 to 99% by weight and other monomer units of 1 to 50% by weight which are copolymerizable with the above.

Other copolymerizable monomers include α,β-unsaturated acids such as alkyl methacrylate, in which the number of carbon atoms of the alkyl group is 2 to 18, alkyl acrylate, in which the number of carbon atoms of the alkyl group is 1 to 18, acrylic acid, or methacrylic acid; unsaturated groups containing divalent carboxylic acids such as maleic acid, fumaric acid, or itaconic acid; aromatic vinyl compounds such as styrene or α-methylstyrene; and α,β-unsaturated nitriles such as acrylonitrile or methacrylonitrile; as well as maleic anhydride, maleimide, N-substituted maleimide, and glutaric anhydride. These may be employed individually or in combinations of at least two types.

Of these, in view of heat-decomposition resistance and fluidity of copolymers, preferred are methyl acrylate, ethyl acrylate, n-propyl acrylate, n-butyl acrylate, s-butyl acrylate, and 2-ethylhexyl acrylate, and methyl acrylate and n-butyl acrylate are particularly preferred to be employed.

The weight average molecular weight of the acrylic resin employed in the acrylic film of the present invention, is preferably within a rage of 110,000 to 1,000,000, more preferably within a rage of 140,000 to 600,000, and specifically preferably within a rage of 200,000 to 400,000.

The weight average molecular weight of acrylic resins of the present invention can be measured via gel permeation chromatography. Measurement conditions are as follows.
Solvent: methylene chloride
Columns: SHODEX K806, K805, and K803G (produced by Showa Denko K. K., three columns were employed via connections)
Column temperature: 25° C.
Sample concentration: 0.1% by weight
Detector: RI Model 504 (produced by GL Sciences Inc.)
Pump: L6000 (produced by Hitachi Ltd.)
Flow rate: 1.0 ml/minute
Calibration curve: A calibration curve prepared by employing 13 samples of standard polystyrene STK (produced by Tosoh Corp.) Mw=2,800,000 to 500 was employed. It is preferable to employ the 13 samples at nearly equal intervals.

The manufacturing methods of acrylic resin (A) in the present invention are not particularly limited, and employed may be any of the conventional methods such as suspension polymerization, emulsion polymerization, bulk polymerization, or solution polymerization. As a polymerization initiator, employed may be common peroxide type and azo type ones. Further, redox type ones may be included. With regard to polymerization temperature, the suspension or emulsion polymerization may be carried out between 30 and 100° C., while the bulk or solution polymerization may be carried out between 80 and 160° C. In order to control the reduction viscosity of the resulting copolymer, polymerization may be carried out employing alkylmercaptan as a chain transfer agent.

As the acrylic resins according to the present invention, also employed may be commercial ones. Examples thereof include DERPET 60N and 80N (both produced by Asahi Kasei Chemicals Co., Ltd.), DIANAL BR52, BR80, BR83, BR85, and BR88 (all manufactured by Mitsubishi Rayon Co., Ltd.), and KT75 (produced by Denki Kagaku Kogyo K. K.).

<Cellulose Ester Resin (B)>

Specifically, in view of lowering of brittleness and transparency when compatibilized with acrylic resin (A), it is preferable that total substitution degree (T) of the acyl group is 2.0 to 3.0, the substitution degree of the acyl group having 3 to 7 carbon atoms is 1.2 to 3.0, and it is more preferable that total substitution degree (T) of the acyl group is 2.5 to 3.0, the substitution degree of the acyl group having 3 to 7 carbon atoms is 2.0 to 3.0.

When the total substitution degree of the acyl group of cellulose ester resin (B) is less than 2.0, acrylic resin (A) and acrylic resin (B) are not sufficiently compatible. As a result, when employed as an optical film, resulting haze is a problem. Further, even though the total substitution degree of the acyl group is 2.0 or more, when the substitution degree of the acyl group having 3-7 carbon atoms is lower than 1.2, sufficient compatibility is also not realized or brittleness is not lowered.

In the present invention, the above acyl group may be either an aliphatic acyl group or an aromatic acyl group. The aliphatic acyl group may be straight-chained or branched, and may have substituents. The portions which are not substituted with the acyl group may exist as a hydroxyl group. These may be synthesized by know methods.

Cellulose ester resin (B) according to the present invention is preferably one type selected particularly from cellulose acetate propionate, cellulose acetate butyrate, cellulose acetate benzoate, cellulose propionate, and cellulose butyrate. Among them, preferable examples of the cellulose ester resins include cellulose acetate propionate and cellulose propionate.

The substitution degree of the acetyl group and other acyl groups refers to the value determined by the method specified in ASTM-D817-96.

Specifically, in view of compatibility with acrylic resin (A) and lowering of brittleness, weight average molecular weight (Mw) of the cellulose ester resins according to the present invention is commonly 75,000 or more, is preferably in the range of 75,000-240,000, is more preferably in the range of 100,000-240,000, but is most preferably in the range of 160,000-240,000. In the present invention, two or more types of cellulose resins may be employed after blending.

In the optical film of the present invention, acrylic resin (A) and cellulose ester resin (B) are incorporated in a compatible state at a weight ratio of 95:5-30:70. The above ratio is preferably 90:10-50:50, but is more preferably 90:10-60:40.

When the weight ratio of acrylic resin (A) and cellulose ester resin (B) is 95:5 or more in such a manner that the weight ratio of acrylic resin (A) is higher, targeted effects due to cellulose ester (B) are not sufficiently realized. In the above ratio of 30:70, the ratio of the acrylic resin becomes lower, whereby the resulting moisture resistance becomes insufficient.

In the optical film of the present invention, it is essential that acrylic resin (A) and cellulose ester resin (B) are incorporated in a compatible state. Physical properties and qualities demanded as an optical film are realized via mutual compensation by achieving compatibility of the different resins.

It is possible to find whether acrylic resin (A) and cellulose ester resin (B) are in a compatible state, by, for example, glass transition temperature Tg.

For example, when both resins, exhibiting different glass transition temperatures, are blended, at least two glass transition temperatures of the blend co-exist due to the presence of each of the resins. On the other hand, when both resins are compatible, the inherent glass transition temperature of each the resins disappears to result in one glass transition temperature which is the glass transition temperature of the resulting compatible resin.

Glass transition temperature, as described herein, refers to an intermediate point glass transition temperature (Tmg) determined in accordance with JIS K7121 (1987) which is measured at a temperature increasing rate of 20° C./minute, employing a differential scanning calorimeter DSC-7, produced by Perkin Elmer Co.).

The optical film of the present invention may be composed of resins other than acrylic resins (A) and cellulose ester resin (B), and additives, as long as its function as an optical film is not adversely affected.

The total weight of acrylic resin (A) and cellulose ester resin (B) in the optical film of the present invention is preferably at least 55% by weight with respect the weight of the optical film, is more preferably at least 60% by weight, but is most preferably at least 70% by weight.

<Acrylic Particles (C)>

The acrylic resin containing film of the present invention may incorporate acrylic particles.

Acrylic particles (C) according to the present invention is characterized in that they exist in a particle state (hereinafter also referred to as a non-miscible state) in an acrylic film containing above described acrylic resin (A) and cellulose ester resin (B).

Acrylic particles (C) employed in the present invention are not particularly limited, but it is preferable that each of acrylic particles is structured to have a layer configuration of at least two layers. Further, it is specifically preferable that each particle is an acrylic granular complex having the following multilayer structure.

The multilayer structure acrylic granular complex refers to a multilayer particle structure of acrylic polymer in which, toward the periphery from the center, an innermost hard layer polymer, a crosslinked soft layer polymer exhibiting rubber elasticity, and the outermost hard layer polymer are arranged.

Preferable examples of the multilayer structure acrylic granular complex employed in the acrylic resin composition according to the present invention, include: an acrylic granular complex which includes a 3-layer structure composed of (a) an innermost hard layer polymer which is prepared by polymerizing a monomer mixture of 80 to 98.9% by weight of methyl methacrylate, 1 to 20% by weight of alkyl acrylate in which the number of carbon atoms of the alkyl group is 1 to 8, and 0.01 to 0.3% by weight of polyfunctional grafting agents, (b) a crosslinked soft layer polymer which is prepared by polymerizing in the presence of the above innermost hard layer polymer, a monomer mixture of 75 to 98.5% by weight of alkyl acrylate in which the number of carbon atoms of the alkyl group 4 to 8, 0.01 to 5% by weight of polyfunctional crosslinking argents, and 0.5 to 5% by weight of functional grafting agents, and (c) an outermost hard layer polymer which is prepared by polymerizing, in the presence of the polymer composed of the above innermost hard layer and crosslinked soft layer, a monomer mixture of 80 to 99% by weight of methyl methacrylate, and 1 to 20% by weight of alkyl acrylate in which the number of carbon atoms of the alkyl group of 1 to 8, and in which the resulting S-layer structure polymer is composed of 5 to 40% by weight of innermost hard layer polymer (a), 30 to 60% by weight of soft layer polymer (b), and 20 to 50% by weight of outermost hard layer polymer (c), and when being subjected to fraction with acetone, an insoluble portion exists and the methyl ethyl ketone swelling degree of the above insoluble portion is 1.5 to 4.0.

As disclosed in JP-B S60-17406 and H03-39095, not only by specifying the composition of each layer of the multilayer structure acrylic granular complex and the particle size, but also by setting the pulling elastic modulus of the multilayer structure acrylic granular complex and the methyl ethyl ketone swelling degree of the acetone-insoluble portion within the specified range, it is possible to realize a sufficient balance between the impact resistance and the stress resistance whitening properties.

It is preferable that innermost hard layer polymer (a), which constitutes the multilayer structure acrylic granular complex, is prepared by polymerizing a monomer mixture composed of 80 to 98.9% by weight of methyl methacrylate, 1-20% by weight of alkyl acrylate in which the number of carbon atoms of the alkyl group is 1 to 20, and 0.01 to 0.3% by weight of polyfunctional grafting agents.

Alkyl acrylates, in which the number of carbon atoms of the alkyl group is 1 to 8, include methyl acrylate, ethyl acrylate, n-propyl acrylate, n-butyl acrylate, s-butyl acrylate, and 2-ethylhexyl acrylate, and of these, preferably employed are methyl acrylate and n-butyl acrylate.

The ratio of alkyl acrylate units in innermost hard layer polymer (a) is commonly 1 to 20% by weight. When the aforesaid units are less than 1% by weight, the resulting polymer tends to thermally decompose, while when they exceeds 20% by weight, the glass transition temperature of innermost hard layer polymer (a) is lowered, whereby impact resistance providing effects of the 3-layer structure acrylic granular complex is degraded. Accordingly, neither case is preferred.

Polyfunctional grafting agents include polyfunctional monomers, having different polymerizable functional groups, such as allyl ester of acrylic acid, methacrylic acid, maleic acid and fumaric acid, and allyl methacrylate is preferably employed. Polyfunctional grafting agents are employed to chemically combine the innermost hard layer polymer and the soft layer polymer. The ratio when employed in the innermost hard layer polymerization is 0.01 to 0.3% by weight.

As crosslinked soft layer polymer (b) which constitutes an acrylic granular complex, preferred is one which is prepared by polymerizing, in the presence of above innermost hard layer polymer (a), a monomer mixture of 75 to 98.5% by weight of alkyl acrylate in which the number of carbon atoms of the alkyl group is 1 to 8, 0.01 to 5% by weight of polyfunctional crosslinking agents, and 0.5 to 5% by weight of polyfunctional grafting agents.

As an alkyl acrylate in which the number of carbon atoms of the alkyl group is 4 to 8, preferably employed are n-butyl acrylate and 2-ethylhexyl acrylate.

Further, together with these polymerizable monomers, it is possible to copolymerize other monofunctional monomers at 25% by weight or less which are copolymerizable.

Other monofunctional monomers which are copolymerizable include styrene and substituted styrene derivatives. With regard to the ratio of alkyl acrylates in which the number of carbon atoms of the alkyl group is 4 to 8 to styrene, as the former ratio increases, the glass transition temperature of polymer (b) is lowered, whereby softness is achievable. On the other hand, in view of transparency of resin compositions, it is advantageous to make close the refractive index of soft layer polymer (b) at normal temperature to that of innermost hard layer polymer (a), outermost hard layer polymer (c), and thermally plastic hard acrylic resins. Upon considering the above, the ratio of both is chosen.

As a polyfunctional grafting agent, employed may be ones cited in the item of above innermost layer hard polymer (a). Polyfunctional grafting agents employed herein are employed to chemically combine soft layer polymer (b) and outermost hard layer polymer (c), and in view of providing of targeted impact resistance effects, the ratio employed during the innermost hard layer polymerization is preferably 0.5 to 5% by weight.

As an employable polyfunctional crosslinking agent may be commonly known crosslinking agents such as divinyl compounds, diallyl compounds, or dimethacryl compounds. Of these, preferably employed are polyethylene glycol diacrylate (at a molecular weight of 200 to 600).

Polyfunctional crosslinking agents, employed herein, are employed to realize effects of impact resistance via formation of a crosslinking structure during polymerization of soft layer (b). However, when the above polyfunctional grafting agents are employed during polymerization of the soft layer, the crosslinking structure in soft layer (b) is formed to some extent. Accordingly, polyfunctional crosslinking agents are not essential components. In view of targeted effects to provide impact resistance, the ratio of polyfunctional crosslinking agents during soft layer polymerization is preferably 0.01 to 5% by weight.

As outermost hard layer polymer (c) which constitutes a multilayer structure acrylic granular complex, preferred is one which is prepared, in the presence of the above innermost hard layer polymer (a) and soft layer polymer (b), by polymerizing a monomer mixture composed of 80 to 99% by weight of methyl methacrylate and 1 to 20% by weight of alkyl acrylate in which the number of carbon atoms in the alkyl group is 1 to 8.

As alkyl acrylates, employed are those described above, and of these, preferably employed are methyl acrylate and ethyl acrylate. The ratio of alkyl acrylate units in uppermost hard layer (c) is preferably 1 to 20% by weight.

Further, to enhance miscibility with acrylic resin (A) during polymerization of outermost hard layer (c), it is possible to employ mercaptan as a chain transfer agent to regulate the resulting molecular weight.

In particular, to improve the balance between elongation and impact resistance, it is preferable to result in a gradient so that the molecular weight gradually decreases from the interior to the exterior. A specific method is as follows. A monomer mixture to form the outermost hard layer is divided into at least two parts. By a technique in which chain transfer agents, which are added each time, are gradually increased, it is possible to decrease the molecular weight of polymers to form the outermost hard layer from the interior of the multilayer structure acrylic granular complex to the exterior.

It is possible to check the molecular weight during the above formation as follows. The monomer mixture employed each time is individually polymerized under the same conditions, and the molecular weight of the resulting polymer is determined.

The diameter of acrylic particles (c) preferably employed in the present invention is not particularly limited. The above diameter is preferably 10 to 1,000 nm, is more preferably 20 to 500 nm, and is most preferably 50 to 400 nm.

In the acrylic granular complex, which is the multilayer structure polymer preferably employed in the present invention, the weight ratio of the core and the shell is not particularly limited. When the entire multilayer structure polymer is assigned at 100 parts by weight, the core layer occupies preferably 50-90 parts by weight, but occupies more preferably 60 to 80 parts by weight.

Examples of commercial products of the above multilayer structure acrylic granular complex include "METABLEN" produced by Mitsubishi Rayon Co., Ltd., "KANEACE" produced by Kaneka Corp., "PARALOID" produced by Kureha Chemical Industry Co., Ltd., "ACRYLOID" produced by Rohm and Haas Co., "STAFILOID" produced by Ganz Chemical Industry Co., and "PARAPET SA" produced by Kuraray Co., Ltd. These products may be employed individually or in combinations of at least two. Specifically preferable examples of acrylic particles (c) include "METABLEN W-341 (C2)" produced by Mitsubishi Rayon Co., Ltd., Chemisnow MR-2G (C3), Ms-300× (C4) produced by Soken Chemical & Engineering Co., Ltd.), etc.

Further, when acrylic particles (c) are added to acrylic film of a the present invention, in the point of preparation of a highly transparent film, it is preferable that the refractive index of the mixture of acrylic resin (A) and cellulose ester resin (B) is near that of acrylic particles (C).

Specifically, any difference in the refractive index between acrylic particles (C) and acrylic resin (A) is preferably 0.05 or less, is more preferably 0.02 or less, but is most preferably 0.01 or less.

In order to satisfy the above refractive index conditions, it is possible to decrease the difference in refractive index by employing a method in which each monomer unit composition ratio of acrylic resin (A) is regulated, and/or a method in which the composition ratio of rubber polymers or monomers employed in acrylic particles (C) is regulated, whereby it is possible to prepare an acrylic resin containing film which excels in transparency.

Difference in refractive index, as described herein, refers to the following difference. The acrylic film of the present invention is sufficiently dissolved in acrylic resin (A)-dissolvable solvents under appropriate conditions so as to prepare a milky-white solution. The resulting solution is separated into a solvent soluble portion and a solvent insoluble portion via an operation such as centrifugal separation. Subsequently, each of the soluble portion (acrylic resin (A)) and the insoluble portion (acrylic particles (C)) is refined. Thereafter, each refractive index is determined (at 23° C. and 550 nm wavelength), whereby the difference in refractive index is obtained.

Methods to blend acrylic resin (A) with acrylic particles (C) in the present invention are not particularly limited. A method is preferably employed in which after blending acrylic resin (A) with other optional components, the resulting blend is homogeneously melt-kneaded via a uniaxial or biaxial extruder while adding acrylic particles (C) at 200 to 350° C.

It is preferable in the acrylic film of this invention to contain the acrylic particles (C) in an amount of 0.5 to 30 percent by weight to the total amount of resins constituting the acrylic film, and it is more preferable to contain the acrylic particles (C) in the range of 1.0 to 15 percent by weight.

<Polyhydric Alcohol Fatty Acid Ester>

Addition of polyhydric alcohol fatty acid esters to the acrylic film of the present invention can improve saponification adaptability.

Examples of fatty acid which constitutes the polyhydric alcohol fatty acid esters used in the present invention, include compounds including, as principal components, blended materials of one or more kinds selected from aliphatic fatty acid with 12 to 22 carbon atoms, such as lauric acid, myristic acid, palmitic acid, stearic acid, behenic acid, 12-hydroxystearic acid, oleic acid, linolic acid, the Ersin acid, and 12-hydroxyoleic acid. Of these, stearic acid is specifically preferable.

Examples of alcohols which constitutes the polyhydric alcohol fatty acid esters used in a the present invention, include compounds including, as principal components, blended materials of one or more kinds selected from adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutyleneglycol, 1,2,4-butanetriol, 1,5-pentanediol, 1,6-hexanediol, 1,2,3-hexanetriol, 1,2,6-hexanetriol, glycerol, digylcerol, galactitol, inositol, mannitol, 3-methylpentane-1,3,5-triol, pinacol, sorbitol, trimethylolpropane, trimethylolethane, pentaerythritol, dipenta erythritol, and xylitol.

Among these, preferable are compounds including, as principal components, either one of pentaerythritol tetra fatty acid ester, dipenta erythritol hexa fatty acid ester, glycerol trifatty acid ester, glycerol or diglycerol fatty acid monoester or diester, and sorbitol fatty acid monoester, diester, or triester. Further, hydroxyl group which is not esterified with fatty acid, may be hydroxyl group itself or may be esterified with acetic acid.

The polyhydric alcohol fatty acid esters are excellent in effects to reduce friction between metals and melted resin in the extruder and to suppress heat generation caused by shearing.

Further, the polyhydric alcohol fatty acid esters are excellent in terms of bleed out because of good compatibility with an acrylic resin (A) and cellulose ester resin (B). Among the polyhydric alcohol fatty acid esters, either glycerine fatty acid ester, diglycerol fatty acid ester, or sorbitan fatty acid ester may be preferable, and glycerol fatty acid monoester may be specifically preferable.

From viewpoints of pollution prevention due to volatility at the time of heating in production processing apparatuses and environment, the number of carbons of the fatty acid used for the polyhydric alcohol fatty acid esters is preferably 12 to 22. Further, from viewpoints of deodorization at the time of preservation and discoloration prevention, saturated fatty acid esters are more desirable than unsaturated fatty acid esters.

The additive amount of polyhydric alcohol fatty acid esters is 0.05 percent by weight to 2.0 percent by weight, and more desirably 0.1 percent by weight to 1.0 percent by weight. If the additive amount is too small, the required effect may not be obtained, and if the additive amount is too much, high temperature resistant and high humidity resistant may deteriorate, and haze, after high temperature and high humidity processing, may deteriorate.

The esterification reaction of polyhydric alcohol fatty acid ester may be attained through fractionation of reactant obtained by an ester exchange reaction between a mixture of one or more kinds of beef fat, lard, chicken fat, fish oil, soybean oil, corn oil, rapeseed oil, palm oil, sunflower seed oil, safflower oil, castor oil, and hydrogenated oil of them and one of glycerol, diglycerol and sorbitol by fractioning methods such as molecular distillation, solvent separation, recrystallization, column chromatography, and supercritical gas extraction. Generally, molecular distillation may be suitable from viewpoints of fields, simplicity in manufacture, quality, and cost.

<Plasticizer>

In the production of the acrylic film relating to the present invention, film formation materials may contain plasticizer.

Examples of employable plasticizer, without being limited specifically thereto, include polyhydric alcohol ester plasticizer, polyester plasticizer, trivalent or more aromatic multivalent carboxylate ester plasticizer, glycolate ester plasticizer, phosphate ester plasticizer, phthalate ester plasticizer, fatty ester plasticizer, sugar ester compound, acrylic polymer. Specifically preferable is polyhydric alcohol ester plasticizer. Further, the additive amount of phosphate ester plasticizer may be preferably 6 percent by weight or less from the viewpoints of durability of a polarization degree.

The plasticizer has preferably a 1% loss-in-weight temperature (Td1) of 250° C. or more, more preferably 280° C. or more, and still more preferably 300° C. or more.

A polyhydric alcohol ester is composed of a fatty acid polyhydric alcohol of not less than divalent and a monocarboxylic acid, and is preferably provided with an aromatic ring or a cycloallyl ring in a molecule.

Polyhydric alcohol preferably utilized in this invention is represented by following formula (1).

$$R1\text{-}(OH)n \qquad \text{Formula (1)}$$

wherein, R1 is an n-valent organic group, n is a positive integer of not less than 2 and OH is an alcoholic or phenolic hydroxyl group.

Examples of preferable polyhydric alcohol include such as the following; however, this invention is not limited thereto.

Listed are such as adonitol, arabitol, ethylene glycol, diethylene glycol, triethylene tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane and xylitol. Preferably are triethylene glycol, tetraethylene glycol, dipropylene glycol, tripropylene glycol, sorbitol, trimethylolpropane and xylitol. Among them, glycerol, trimethylolethane, trimethylolpropane, and pentaerythritol are especially desirable.

Monocarboxylic acid utilized in polyhydric alcohol ester is not specifically limited and such as conventionally known fatty acid monocarboxylic acid, alicyclic monocarboxylic acid and aromatic monocarboxylic acid can be utilized. It is preferable to utilize alicyclic monocarboxylic acid or aromatic monocarboxylic acid with respect to improvement of moisture permeability and reservation property. Examples of preferable monocarboxylic acid include the followings; however, this invention is not limited thereto.

As fatty acid monocarboxylic acid, fatty acid having a straight chain or a branched chain of carbon number of 1 to 32 can be preferably utilized. The carbon number is more preferably 1 to 20 and specifically preferably 1 to 10. It is preferable to incorporate acetic acid because of increasing miscibility with cellulose ester, and it is also preferable to utilize acetic acid and other monocarboxylic acid by mixing.

Preferable monocarboxylic acid includes saturated fatty acid such as acetic acid, propionic acid, butyric acid, valeric acid, caproic acid, enanthic acid, caprylic acid, pelargonic acid, capric acid, 2-ethyl-hexanoic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid; and unsaturated fatty acid such as undecylenic acid, oleic acid, sorbic acid, linoleic acid, linolenic acid and arachidonic acid.

Examples of preferable alicyclic monocarboxylic acid include cycloalkyl group with 3 to 8 carbon atoms, and specific examples include cyclopentane carboxylic acid, cyclohexane carboxylic acid and cyclooctane carboxylic acid or derivatives thereof.

Examples of preferable aromatic monocarboxylic acid include those in which an alkyl group is introduced into a benzene ring of benzoic acid, such as benzoic acid and toluic acid, and aromatic monocarboxylic acid having at least two benzene rings such as biphenyl carboxylic acid, naphthalene carboxylic acid and tetralin carboxylic acid. Benzoic acid is specifically preferable.

These alicyclic monocarboxylic acid and aromatic monocarboxylic acid may be substituted, and examples of substituents include halogen atoms, such as a chlorine atom, a bromine atom, and a fluorine atom; alkenyl groups, such as a hydroxyl group, an alkyl group, an alkoxy group, a cycloalkoxy group, an aralkyl group (its phenyl group may be further substituted with an alkyl group or a halogen atom), a vinyl group, and an allyl group; acyl group with 2 to 8 carbon atoms, such as a phenyl group (its phenyl group may be further substituted with an alkyl group or a halogen atom), a phenoxy group (its phenyl group may be further substituted with an alkyl group or a halogen atom), an acetyl group, and a propionyl group; and non-substituted carbonyl oxy group with 2 to 8 carbon atoms, such as an acetyloxy group, and a propionyloxy group.

A molecular weight of polyhydric alcohol ester is not specifically limited, however, is preferably in a range of 300 to 1,500 and more preferably in a range of 400 to 1000 from the viewpoints of volatility, compatibility, and the like.

Carboxylic acid utilized in polyhydric alcohol may be either one type or a mixture of two or more types. Further, OH groups in polyhydric alcohol may be all esterified or may partly remain as an OH group.

Polyhydric alcohol ester may be synthesized by well-known methods. Examples of the methods include a method of esterifying monocarboxylic acid and the above-mentioned polyhydric alcohol through condensation under existence of an acid, a method of reacting acid chloride of acid anhydride prepared beforehand by use of an organic acid with a polyhydric alcohol, and a method of reacting phenyl ester of an organic acid with the polyhydric alcohol, and from these methods, a method with a sufficient yield may be selected appropriately in accordance with a target ester compound.

Polyhydric alcohol ester as a plasticizer may serve as the above-mentioned polyhydric alcohol fatty acid ester.

Preferable examples of the polyester plasticizer include a polyester plasticizer having an aromatic ring or a cycloalkyl ring in its molecule. The preferable polyester plasticizer may be represented, for example, with the following Formula (I) without being limited specifically thereto.

$$B\text{-}(G\text{-}A)_{n-1}\text{-}G\text{-}B \quad \text{Formula (i)}$$

wherein B represents a benzene monocarboxylic acid residue; G represents an alkylene glycol residue having 2 to 12 carbon atoms, an aryl glycol residue having 6 to 12 carbon atoms, or an oxyalkylene glycol residue having 4 to 12 carbon atoms; A represents an alkylene dicarboxylic acid residue having 4 to 12 carbon atoms or an aryldicarboxylic acid residue having 6 to 12 carbon atoms; and n represents an integer of 1 or more.

In Formula (i), constitution is performed employing the benzene monocarboxylic acid residue represented by B, the alkylene glycol residue, the oxyalkylene glycol residue, or the aryl glycol residue represented by G, and the alkylene dicarboxylic acid residue or the aryl dicarboxylic acid reside represented by A, and preparation is performed employing the same reactions as for common polyester type plasticizers.

Examples of a benzene monocarboxylic acid component of the aromatic terminal ester plasticizer of the present invention include: benzoic acid, p-tert-butyl benzoic acid, o-toluic acid, m-toluic acid, p-toluic acid, dimethyl benzoic acid, ethyl benzoic acid, n-propyl benzoic acid, aminobenzoic acid and acetoxy benzoic acid, which may be used alone or in combination of two or more acids.

Examples of an alkylene glycol component having 2 to 12 carbon atoms of the aromatic terminal ester plasticizer include: ethylene glycol, 1,2-propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol(neopentylglycol), 2,2-diethyl-1,3-propanediol (3,3-dimethylol pentane), 2-n-butyl-2-ethyl-1,3-propanediol (3,3-dimethylol heptane), 3-methyl-1,5-pentanediol-1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, which may be used alone or in combination of two or more glycols.

Examples of an oxyalkylene glycol component having 4-12 carbon atoms of the aromatic terminal ester include: diethylene glycol, triethylene glycol, tetraethylene glycol, dipropylene glycol and tripropylene glycol, which may be used alone or in combination of two or more glycols.

Examples of an alkylene dicarboxylic acid component having 4 to 12 carbon atoms of the aromatic terminal ester include: succinic acid, maleic acid, the fumaric acid, glutaric acid, adipic acid, azelaic acid, sebacic acid and dodecane dicarboxylic acid, which may be used alone or in combination of two or more acids. Examples of an aryl dicarboxylic acid component having 6 to 12 carbon atoms include: phthalic acid, terephthalic acid, 1,5-naphthalene dicarboxylic acid and 1,4-naphthalene dicarboxylic acid, which may be used alone or in combination of two or more acids.

The number average molecular weight of the aromatic terminal ester plasticizer used in the present invention is preferably 400 to 2,000, and more preferably 500 to 1,500. The acid value of the aromatic terminal ester plasticizer used in the present invention is preferably not more than 0.5 mgKOH/g and hydroxyl value is preferably not more than 25 mgKOH/g, and more preferably the acid value not more than 0.3 mgKOH/g, and the hydroxyl value of not more than 15 mgKOH/g.

Examples of trivalent or more aromatic multivalent carboxylate plasticizer include trimesic acid ester, trimellitic acid ester, and pyromellitic acid ester. The alcohol to form an ester with the aromatic multivalent carboxylic acid may be alcohol 1 to 8 carbon atoms.

Specifically preferable examples of trivalent or more aromatic multivalent carboxylate ester plasticizer include, without being limited thereto, trimesic acid tributyl, trimesic acid trihexyl, trimesic acid tri 2-ethyl-hexyl, trimesic acid tricyclo hexyl, trimellitic acid tributyl, trimellitic acid trihexyl, trimellitic acid tri 2-ethyl-hexyl, trimellitic acid tricyclo hexyl, pyromellitic acid tetrabutyl, t pyromellitic acid tetrahexyl, pyromellitic acid tetra 2-ethyl hexyl, pyromellitic acid tetracyclohexyl.

Examples of glycolate plasticizers include ethylphthalyl ethyl glycolate, and butyl phthalyl butyl glycolate; examples of phosphate plasticizers include triphenyl phosphate, tricresyl phosphate, cresyldiphenyl phosphate, octyl diphenyl phosphate, diphenylbiphenyl phosphate, trioctylphosphate, tributyl phosphate, 1,3-phenylenebis(dixylenylphosphate), and 1,3-phenylenebis(diphenyl phosphate); examples of phthalate ester plasticizers include diethyl phthalate, dimethoxyethyl phthalate, dimethyl phthalate, dioctyl phthalate, dibutyl phthalate, butylbenzyl phthalate, and di-2-ethyl hexyl phthalate. In addition, citrate plasticizers, such as acetyl tributyl citrate, an epoxidation oil plasticizers may be employed.

<<An Antioxidant, a Heat Deterioration Inhibitor>>

In the present invention, as an antioxidant and a heat deterioration inhibitor, usually-known deterioration prevention agents (an antioxidant, a peroxide decomposition agent, a radical inhibitor, a metal deactivator, an acid trapping agent, amine, etc.) may be employed. In particular, compounds of a lactone type, a sulfur type, a phenol type, a double bond type, a hindered amine type, and a phosphorus type can be used preferably. Heat deterioration inhibitors are disclosed in Japanese Unexamined Patent Publication Nos. 3-199201, 5-194789, 5-271471, and 6-107854.

Preferable examples of the phenol type compounds includes compounds having a 2,6-dialkyl phenol structure, which is commercially available with trade names, such as "Irganox1076" and "Irganox1010" from Ciba Specialty Chemicals, Inc.

Examples of the phosphorus type compounds include compounds commercially available with trade names, such as "Sumilizer GP" from Sumitomo Chemical Co., Ltd., "ADK STAB PEP-24", "ADK STAB PEP-36" and "ADK STAB 3010" from ADEKA Corp., "IRGAFOS P-EPQ" from Ciba Specialty Chemicals, Inc. and GSY-P101 from SAKAI CHEMICAL INDUSTRY CO., LTD.

Examples of the hindered amine type compounds include compounds commercially available with trade names, such as inuvin144 and Tinuvin770 from Ciba Specialty Chemicals, Inc., and ADK STAB LA-52 from ADEKA Corp.

Examples of the sulfur type compounds include compounds commercially available with trade names, such as Sumilizer TPL-R and Sumilizer TP-D, from Sumitomo Chemical Co., Ltd.

Examples of the double bond type compounds include compounds commercially available with trade names, such as Sumilizer-GM and Sumilizer-GS from Sumitomo Chemical Co., Ltd.

Further, examples of the acid trapping agent include compounds including an epoxy group described in the U.S. Pat. No. 4,137,201.

The additive content of these antioxidants may be determined appropriately in accordance with a process at the time of recycles use. Generally, these antioxidants are added in an amount of 0.05 to 5 weight percent to resin as main materials of film.

These antioxidants and heat deterioration inhibitors may be used in combination of several different kind compounds preferable than a single kind, so that the synergistic effect can be acquired. For example, a lactone type, a phosphorus type, a phenol type, and a double bond type compound are preferably used in combination.

<<Colorant>>

In the present invention, colorants may be employed. Usually, the colorant means dyes and pigments. However, in the present invention, the colorant means composition having an effect to change the color tone of a liquid crystal display into a blue tone, an effect to adjust an yellow index (the degree of yellow), or an effect to reduce haze.

Employable examples of the colorants include various kinds of dyes and pigments. However, an anthraquinone dye, an azo dye, a phthalocyanine pigment are effective.

<<Ultraviolet Absorber>>

Examples of the ultraviolet absorbers usable in the present invention include, without being limited specifically thereto, oxy benzophenone type compounds, benzotriazol type compounds, salicylate type compounds, benzophenone type compound, cyanoacrylate type compounds, triazine type compounds, nickel complex salt type compounds, inorganic powder, and the like. In addition, macromolecule type ultraviolet absorber may be employed. Preferable examples of the ultraviolet absorbers usable in the present invention include benzotriazol type compounds and benzophenone type compounds which have high transparency and an effect to prevent deterioration of a polarizing plate and a liquid crystal element. Among them, benzotriazol type compounds are specifically preferable because of few possibilities to cause unnecessary colors. Examples of the ultraviolet absorbers usable preferably in the present invention include, without being limited specifically thereto, TINUVIN 109, TINUVIN 171, TINUVIN 326, TINUVIN 327, TINUVIN 328, TINUVIN 900, TINUVIN 928, which are produced by Ciba Japan Inc., and LA-31 produced by ADEKA Corp. Further, as an ultraviolet absorber, a polymer ultraviolet absorbent may also be used preferably, and, specifically, a polymer type ultraviolet absorber disclosed in Japanese Unexamined Patent Publication No. 6-148430 is used preferably. These ultraviolet absorbers may be used independently or may be used as a mixture of two or more sorts.

The used amount of the ultraviolet absorber used is not uniform depending on the kind of compound, a service condition, and the like. However, when the dry layer thickness of a cellulose ester film is 30 to 200 μm, the used amount is preferably 0.5 to 4.0 percent by weight, and more preferably 0.6 to 305 percent by weight.

<<Matting Agent>>

In the present invention, inorganic particles may be added as a matting agent if needed. Examples of inorganic particles include silicon dioxide (silica), titanium dioxide, aluminium oxide, zirconium oxide, calcium carbonate, calcium carbonate, talc, clay, calcination kaolin, calcination calcium silicate, hydration calcium silicate, aluminium silicate, magnesium silicate, and calcium phosphate. Among them, silicon dioxides are preferable from the viewpoints of lowering of haze.

Moreover, matting agent fine particles are preferably subjected to surface treatment with an organic compound because of lowering of haze of film. Examples of the organic compounds used to the surface treatment include halosilane compounds, alkoxysilane compounds, silazane and siloxane.

As an average size of fine particles is larger, the matting effect becomes larger. However, since particles with a smaller average size are excellent in transparency, in the present invention, the average size of primary fine particles is preferably 7 to 20 nm, and more preferably 5 to 50 nm. These fine particles may be contained in secondary aggregate with a particle size of 0.05 to 0.3 μm.

The content of these particles in a cellulose ester film is preferably 0.05 to 1 percent by weight, and specifically preferably 0.1 to 0.8 percent by weight. In the case of a cellulose ester film with a multi layer structure produced by a co-casting method, it is desirable to contain this additive amount of fine particles in the surface layer.

Examples of the silicone dioxide fine particles include Aerosil R972, R972V, R974, R812, 200, 200V and 300, 8202, OX50, TT600, NAX50, which are manufactured by Nihon Aerosil Co., Ltd., and SEAHOSTAR KE-P10, KE-P30, KE-P50, KE-P100, which are manufactured by NIPPON SHOKUBAI Co., Ltd.

Examples of zirconium oxide particles include particles commercially available with trade names, such as Aerosil R976 and R811 manufactured by Nihon Aerosil Co., Ltd.

Examples of the polymer include a silicone resin, fluorine resin, and an acrylic resin. Preferable is silicone resin, and especially preferable is silicone resin with a three dimensional network structure. Examples of the silicone resin includes silicone resins commercially available with trade names, such as Tosspart 103, 105, 108, 120, 145, 3120, and 240 which are manufactured by Toshiba Silicone Corporation.

Among the abovementioned matting agents, Aerosil R972V, NAX50, SEAHOSTAR KE-P30 are specifically preferable because of the effect to reduce a coefficient of friction greatly while keeping a low turbidity of a cellulose ester film.

<Film Producing Method for an Acrylic Film>

The acrylic film of the present invention can be produced by a solution casting method and a melting casting method. First, the melting casting method will be explained hereafter.

(Melt Casting Film Producing Method)

Acrylic film producing methods by melt casting film producing methods may be classified into a melt extrusion molding method, a press molding method, an inflation method, an injection molding method, a blow molding method and a stretch molding method. Among these methods, in order to obtain an acrylic film excellent in excellent mechanical strength and excellent surface accuracy, the melt extrusion molding method is preferable.

Hereafter, based on an example of the melt extrusion molding method, the production method for an acrylic film of the present invention will be explained. In the production method for an acrylic film, the conditions of melt extrusion may be made the same as that used for common thermoplastic resins.

<<Pellet Manufacturing Process>>

It is preferable that a plurality of raw materials used for melt extrusion is kneaded beforehand and are usually pelletized.

A well-known method is employed for the pelletizing. For example, dry cellulose ester and other additives are supplied to an extruder with a feeder, kneaded by the use of a uniaxial or biaxial extruder, extruded in the shape of a strand from a die, cooled with water-cooling or air cooling, and then cut into pellets.

A matting agent, UV absorbent, etc. may be sprinkled on the obtained pellets, or may be added in an extruder at the time of forming a film.

It is important to dry the raw materials before carrying out extrusion in order to prevent decomposition of the raw materials. Especially, since cellulose ester tends to absorb moisture easily, it is desirable to dry it at 70 to 140° C. for 3 hours or more with a dehumidification hot air dryer or a vacuum dryer such that the moisture content is made 200 ppm or less, more preferably 100 ppm or less.

Additives may be mixed before being supplied to an extruder, or may be supplied respectively by respective feeders. A small amount of additives such as an antioxidant may be preferably mixed in advance in order to mix it uniformly.

A vacuum mixer may be preferable, because it can make drying and mixing simultaneously. Moreover, when the pellets may touch with air at the outlet of a feeder section and a die, it is desirable to make the outlet under atmosphere such as dehumidified air and dehumidified N2 gas.

Moreover, it is desirable to keep a feed hopper to an extruder warm, because it can prevent moisture absorption.

It is desirable to suppress the shearing power of an extruder and to process at a temperature capable of pelletizing as low as possible in order to avoid the deterioration of resin (the decrease of a molecular weight, coloring, gel formation, etc.). For example, in the case of a biaxial extruder, it is desirable to rotate them in the same direction by the use of a deep groove type screw. In the viewpoint of the homogeneity in kneading, an engagement type is desirable. Although a kneader disk can improve a kneading ability, cautions are needed for heat generation caused by shearing.

Suctioning may be conducted from a vent hole if needed. As long as it is low temperature, since it hardly generates a volatile component, no vent hole may be provided.

With regard to the color of a pellet, b* value being an index of yellow is desirably in the range of −5 to 10, more desirably −1 to 8, and still more desirably −1 to 5. The b* value can be measured by the use of a spectrocolorimetry meter CM-3700d (manufactured by Konica Minolta Sensing Company Ltd.) with a light source of D65 (color temperature: 6504K) at a view angle of 10°.

The film formation is performed by use of the pellets obtained above. Of course, it is also possible not to pelletize, but to supply the powder of a raw material as it is to an extruder with a feeder, and to carry out a film formation by using it.

<<Melt Extruding Process>>

Materials, such as a pellet are preferably dried beforehand. Specifically, the materials are preferably by a vacuum or reduced-pressure drier and a dehumidified hot air drier such that a moisture content is made 200 ppm or less, preferably 100 ppm or less.

Polymer having been dried by a dehumidified hot wind or under vacuum or reduced pressure is melt by use of a uniaxial or biaxial type extruder, and after foreign matters having been eliminated by filtering through such as a leaf disc type filter, the melt polymer is cast in a film form through a casting die to be solidified on a cooling drum.

Various types of commercially available extruders are usable as extruder, but a melt-knead extruder which may be a uniaxial extruder or a biaxial extruder is preferable.

Introduction into extruder from a supply hopper is preferably performed under vacuum, or under a reduced pressure or inert gas atmosphere to prevent such as oxidative decomposition of polymer.

A melting temperature of the film constituting material inside extruder is conventionally 150-300° C., preferably 180-270° C., and more preferably 200-260° C., though the preferable condition depends on viscosity and a discharging amount of the film constituting material, and thickness of a sheet to be prepared.

The melt viscosity during extrusion is 10-100000 poises, and preferably 100-10000 poises. The shorter retention time of the film constituting material in extruder is preferred, and it is within five minutes, preferably within three minutes, and more preferably within two minutes.

The retention time depends on the type of extruder and the extrusion conditions, but it is possible to be reduced by adjusting a supply amount of the material, the L/D, the number of rotations of the screw and depth of the screw groove.

The shape, the number rotations of the screw and so forth of extruder are appropriately selected in response to the viscosity and discharging amount of the film constituting material. In the present invention, a shear speed of extruder is 1-10000/sec, preferably 5-1000/sec, and more preferably 10-100/sec.

The film constituting material extruded from extruder is fed to casting die, and extruded in the form of a film from the slit of casting die. Casting die is not specifically limited as long as it is used to prepare a sheet or a film.

The material of casting die is exemplified by hard chromium, chromium carbonate, chromium nitride, titanium carbide, titanium carbonitride, titanium nitride, cemented carbide, ceramic (tungsten carbide, aluminum oxide or chromium oxide) or the like, which is to be sprayed or plated. Then they are subjected to surface processing, as exemplified by buffing and lapping with a grinder having a count of #1000 or later planar cutting (in the direction perpendicular to the resin flow) with a diamond wheel having a count of #1000 or higher, electrolytic grinding, and electrolytic complex grinding. The desired material in the lip portion of casting die is the same as that of casting die. The surface accuracy of the lip portion is preferably 0.5 S or less, and more preferably 0.2 S or less.

The slit of casting die is designed in such a way that the gap can be adjusted.

Of a pair of lips forming slit of flow casting die, one is flexible lip exhibiting deformable, low rigidity, and the other is stationary lip.

A lot of heat bolts are arranged at a predetermined pitch across casting die, namely, along the length of slit. Each heat bolt includes block 36 fitted with embedded electric heater and a cooling medium passage, and each heat bolt passes through block in the vertical direction.

The base of heat bolt is fixed on die (main body) 31, and the end is brought into contact with the outer surface of flexible lip. While constantly cooling block, the input of embedded electric heater is adjusted to increase or decrease the temperature of block, this adjustment causes thermal extension and contraction of heat bolt, resulting in displacement of flexible lip, whereby the film thickness is adjusted.

A thickness gauge is provided at a predetermined position in the wake flow of the die. The web thickness information detected by this gauge is fed back to the control apparatus. This thickness information is compared with the preset thickness information of the control apparatus, whereby power of a heating member of the heat bolt, or an ON-rate thereof can be controlled by the signal for a correction control amount sent from this apparatus.

The heat bolt preferably has a length of 20-40 cm, and a diameter of 7-14 mm. A plurality of heat bolts, for example, several tens of heat bolts are preferably arranged at a pitch of 20-40 mm.

A gap adjusting member fitted with mainly a bolt to adjust a slit gap via manual movement in the axial direction may be provided in place of a heat bolt.

The slit gap adjusted by the gap adjusting member conventionally has a diameter of 200-2000 µm, preferably 300-1000 µm, more preferably 400-800 µm.

It is preferable to stably control the extrusion flow rate by utilizing such as a gear pump. Further, as a filter utilized for elimination of foreign matters, a stainless fiber sintered filter is preferably utilized.

A stainless fiber sintered filter is comprised of a stainless fiber assembly having been made into a complex coiled state and compressed to sinter the contacting points resulting in one body, and the filtering precision is adjustable by varying a density depending on the fiber thickness and the compression amount.

One in which coarse and dense filtering precisions are repeated plural times to make a multi-layered body is preferable. Further, it is preferable to make a filter having a composition of gradually increasing filtering precision or of repeating coarse and dense filtering precisions since a filter life is prolonged as well as capturing efficiency of foreign matters and gel is improved.

There is a case to generate a defect of a streak form when a flaw or a foreign matter is adhered on a die. Such a defect is also called as a die line, and it is preferable to make a structure having as small stagnant portion of resin as possible to minimize surface defects such as a die line. It is preferable to use a die having as minimum flaws as possible in the interior and on a lip of a die.

The inside surface of an extruder or a die which contacts with melt resin is preferably subjected to a surface treatment to be made barely adhere melt resin by decreasing the surface roughness or by utilizing a material having a low surface energy. Specifically, listed are those having been subjected to hard chromium plating or ceramic melt spattering are ground to make a surface roughness of not more than 0.2 S.

An additive such as a plasticizer may be mixed with resin in advance or may be kneading mixed in the way of an extruder. It is preferable to utilize a mixing device such as a static mixer for homogeneous addition.

<<Cooling Roller>>

The cooling roller of the present invention is not limited specifically, and is a high-rigidity metallic roller provided with a structure to flow a temperature controllable heating medium or cooling medium in the roller. The size of the cooling roller is not limited and may be a size enough for cooling a melted cast film. Generally, the diameter of the cooling roller is 100 mm to 1 m. Examples of the surface material of the cooling roller include a carbon steel, a stainless steel, an aluminum and a titanium. Further, surface treatments such as a hard chrome-plating, a nickel plating, an amorphous chrome-plating, or a ceramic spraying may be preferably applied in order to increase a hardness of the surface and to improve a peeling ability for a resin.

The cooling roller is made of a seamless steel pipe with a wall thickness of about 20 to 30 mm, and the surface is finished to a mirror plane.

The surface roughness of the cooling roller may be preferably 0.1 µm or less in Ra, more preferably 0.05 µm or less. The smoother, the roller surface is, the smoother the surface of the obtained film is made.

The melt extruding process of the present invention may include at least one cooling roller, and preferably include two or more cooling rollers. In the case of a single cooling roller, the surface temperature of the cooling roller is set to ($Tg-50 \leq Tr \leq Tg$), and in the case of two or more cooling rollers, the surface temperature Tr1 of the first cooling roller and the surface temperature Tr2 of the second cooling roller are set to ($Tg-50 \leq Tr1 \leq Tg$) and ($Tg-50 \leq Tr2 \leq Tg$).

Preferably, the surface temperatures Tr1 and Tr2 are set to $Tr2>Tr1$ and $0<Tr2-Tr1<50$.

With this, the coagulation amount of the additive onto the cooling roller can be controlled, and the additive may be re-melted in a cellulose film.

The re-melting of the additive can be promoted also by the contact time between a cellulose ester film and the first and second cooling rollers. In the present invention, the contact time is preferably 1.0 seconds or more and 3.0 seconds or less.

In this regard, the contact time is expressed with the number of seconds calculate from the distance of the circumference from a contact point at which a film starts to come in contact with a roller to a contact point at which the film starts to separate from the roller, and the conveying speed of the film.

The circumferential speed R2 of the second cooling roller is preferably larger than the circumferential speed R1 of the first cooling roller. With this, tension works on the film between these two rollers, and the adhesiveness between the film and the first roller increases. A ratio of these circumferential speeds is desirably in a range of 1.00 to 1.05, and when the ration exceeds 1.05, there is a risk that film may fracture. Similarly, it is desirable that the circumferential speed of the third or later cooling rollers is larger than the circumferential speed of the last cooling roller thereof <<Elastic Touch Roller>>

The touch roll which comes in contact with a cooling roller, is desirable to have elasticity on its surface, to deform along the surface of the cooling roller by the pressing force toward the cooling roller, and to form a nip with the cooling roller therebetween.

Concrete examples of the elastic touch rollers include elastic touch rollers disclosed in Japanese Patent Nos. 3194904 and 3422798, Japanese Paten O.P.I. Publication Nos. H03-124425, H08-224772, H07-100960, and H10-272676, WO97/028950 pamphlet, and Japanese Paten O.P.I. Publication Nos. H11-235747, 2002-36332, 2002-36333, 2005-172940 and 2005-280217.

The resilient touch roller preferable in the present invention has a double structure of the metallic outer cylinder and the inner cylinder and a space capable of making a cooling fluid to flow between them.

Further, since the metallic outer cylinder is resilient, the temperature of the surface of the touch roller can be controlled precisely, and by utilizing the nature capable of deforming elastically appropriately it has an effect to obtain a distance to press the film in a longitudinal direction, thereby reducing deterioration and distortion due to heat.

The thickness of the metallic outer cylinder may preferably satisfy the formula of ($0.003 \leq$ (the thickness of the metallic outer cylinder/the radius of the touch roller)$\leq 0.03$), because an appropriate elasticity may be secured. Namely, if the radius of the touch roller or the radius of the metallic outer cylinder is larger, the metallic outer cylinder may sag appropriately even if its thickness is thicker. If the thickness of the metallic outer cylinder is too thin, the strength becomes insufficient, and thus causing a fear of breakage. On the other hand, if the thickness of the metallic outer cylinder is too thick, the weight of the roller becomes too heavy, and thus causing a fear of rotational irregularity.

Therefore, the thickness of the metallic outer cylinder may be preferably within a range of from 0.1 to 5 mm.

The diameter of the touch roller may be desirably 100 mm to 600 mm, a roller effective width=500 to 1600 mm, an oblong configuration (r/L<1).

The roughness of the surface of the metallic outer cylinder may be preferably 0.1 μm or less, more preferably 0.05 μm or less. The smoother, the surface of the roller is, the smoother the surface of the obtained film becomes.

The material of the metallic outer cylinder is required to be smooth, appropriately elastic, and durable. A carbon steel, a stainless-steel, a titanium, or a nickel alloy manufactured by an electroforming method may be preferably employed. Further, surface treatments such as a hard chrome-plating, a nickel plating, an amorphous chrome-plating, or a ceramic spraying may be preferably applied in order to increase a hardness of the surface and to improve a peeling ability for a resin. It may be preferable to further polish the surface having been subjected to the surface treatment to obtain the above-mentioned surface roughness.

The inner cylinder is preferably an inner cylinder which is made of a carbon steel, a stain-less steel, an aluminum and a titanium, is light and has a rigidity. By providing an inner cylinder with a rigidity, a rotational deflection of the roller may be refrained. By providing an inner cylinder with a rigidity, a rotational deflection of the roller may be refrained. The thickness of the inner cylinder may be two to ten times thicker than that of the outer cylinder, thereby obtaining a sufficient rigidity.

The inner cylinder may be covered with elastic resin materials such as silicone and a fluorine-contained rubber.

The structure of a space to flow a cooling fluid may be one which can control the temperature of the surface of the roller uniformly. For example, with a structure in which a fluid flows alternately forwardly and backwardly in a widthwise direction, or with a structure in which a fluid flows in a spiral form, the temperature control can make the temperature distribution on the surface of the roller uniform.

As the cooling fluid, water or oil may be employed in accordance with a used temperature range without specific restriction.

The surface temperature (TrO) of the touch roller is preferably lower than the glass transfer temperature (Tg) of a film. If it is higher than Tg, the peeling ability between the film and the roller may deteriorate. Therefore, the temperature is more preferable within a range of from (Tg-50° C.) to Tg.

The elastic touch roller may be preferably a crown-shaped roller in which the diameter at a central portion in a widthwise direction is larger than that at end portions.

Generally, the touch roller is pressed onto the film with both ends applied a pushing force by a pushing means. In this case, since the touch roller deforms or sags, the both end portions tend to push with a force larger than that at the central portion. Accordingly, by making a roller made to be the crown-shaped roller, the pressing can be conducted with a high evenness.

The width of the elastic roller used in the present invention preferably made to be wider than that of a film, because the entire surface of the film can be brought in close contact with the cooling roller. Further, if a draw ratio becomes larger, the thickness of the film becomes thicker than the central portion due to "neck-in phenomena". In this case, in order to avoid the high thickness at the both end portions, the width of the metallic outer cylinder may be made narrower than that of the film, or the outer diameter of the metallic outer cylinder may be made smaller.

In order to avoid the deformation or sagging, a support roller may be provided as a position opposite to the touch roller across the cooling roller.

There may be provided a cleaning device to clean dirt on the touch roller. The cleaning device may preferably employ, for example, a method of pushing a member such as a non-woven cloth soaked with a solvent onto the surface of the roller as required, a method of immerse the roller in a liquid, and a method of vaporizing dirt on the surface of the roller by a corona discharging, a glow discharging, and a plasma discharging.

In order to make the surface temperature of the touch roller uniform more, the touch roller may be brought in contact with a temperature control roller, a temperature-controlled air may be blown onto the touch roller, or the touch roller may be brought in contact with a heat medium such as a liquid.

In the present invention, at the time of pressing of the touch roller, the touch roller line pressure may be adjusted to be 9.8 N/cm or more, 147 N/cm or less. If the touch roller line pressure is lower than this range, dye lines may not be removed sufficiently.

The line pressure is a value calculated by dividing a pushing force applied onto the film by the touch roller with the width of the film at the time of pushing. A method to make the line pressure within the above range is not specifically limited, and for example, the both ends of the roller may be pushed with an air cylinder or a hydraulic cylinder.

Alternatively, the film may be indirectly pressed with the touch roller which is pushed by the support roller.

In order to cancel die lines preferably with the touch roll, it is important to make the viscosity of an acrylic film within an appropriate range when the touch roll presses the acrylic film with nipping.

In this regard, it is known that the change of the viscosity of cellulose ester depending on temperature is comparatively large.

When the glass transition temperature of an acrylic film is expressed with Tg, the film surface temperature Tt immediately before the extruded film is pressed to the touch roller is made preferably to satisfy the formula (Tg<Tt<Tg+110° C.).

Namely, if the temperature Tt of the film just before being pressured by the pinching of the touch roll is made within the above range, the viscosity of the film at the time of pressing of the film with the pinching can be set within an appropriate range, so that die lines can be rectified. Further, the film surface comes uniformly in contact with the roller, so that die lines can be rectified.

The film surface temperature Tt is set to preferably Tg+10° C.<Tt<Tg+90° C., and more preferably Tg+20° C.<Tt<Tg+70° C.

A method of making the film temperature at the time of pressing within the above range is not limited specifically, for example, includes a method of refraining cooling between a die and a cooling roller by placing the die in close proximity to the cooling roller, a method of keeping a temperature by enclosing around the die and the cooling roller with a heat insulating material and a method of heating with hot air, an infra-red radiation heater, or a microwave heating device. Of course, the extruding temperature may be set higher.

The film surface temperature and a roller surface temperature may be measured a non-contact type infra-red thermometer. Concretely, the temperature is measured at 10 points with a distance of 0.5 m from an object to be measured with a non-contact type handy thermometer (IT2-80, manufactured by Keyence Corporation).

The film surface temperature Tt at the touch roller side represents a film surface temperature of a conveyed film measured with the non-contact type infra-red thermometer from the touch roller side on a condition that touch roller is dismounted.

<<Casting Process>>

In the present invention, the reduced pressure of 70 kPa or less in the portion from the opening portion (lip) of the casting die to the cooling roller exhibits the rectifying effect for the above die line more greatly.

The reduced pressure is preferably 50 to 70 kPa. The method for maintaining the pressure in the portion from the opening portion (lip) of the casting die to the cooling roller in a range of 70 kPa or less is not limited specifically, but include a method of reducing pressure by covering a periphery from the casting die to the roller with a pressure resistance member.

At this time, a suction unit is preferably provided with countermeasures such as heating with a heater to avoid the adhesion of sublimate on the suction unit itself. In the present invention, since the suction pressure is too small to suck sublimate effectively, the suction pressure is needed to be adjusted properly.

In the present invention, a melted material including a cellulose resin is extruded from a die to form a film provided with a draw ratio of 5 or more and 30 or less and the thus obtained film is conveyed while being pressed onto the cooling roller with the elastic touch roller. The draw ratio is a value calculated by dividing a lip clearance of a die with an average thickness of a film solidified on the cooling film. By making the draw ratio within the above range, occurrences of stakes and spot unevenness on an image indicated on a liquid crystal display device can be reduced and a polarizing plate protective film having a good productivity can be obtained.

The draw ratio can be adjusted with the die lip clearance and the drawing speed of the cooling roller. The die lip clearance is desirably 900 μm or more, more desirably from 1 mm to 2 mm. If the draw ratio is too large or too small, spot-like unevenness may not be improved.

At the time of nipping of film between the cooling roller and the elastic touch roller, the touch roller side film temperature is made preferably to Tg of the film or more and (Tg+110° C.) or less, because the imaging properties of the film surface can be adjusted. As such a roller with an elastic surface to be used for the above object, well-known rollers may be employed.

When the film is peeled off from the cooling roller, it is desirable to control tension so as to prevent deformation of the film.

<<Roll Cleaning Facility>>

It is desirable to provide a device to clean a drum and a roll to the manufacturing apparatus of the present invention. Examples of the cleaning devices include, without being limited specifically thereto, devices of a type to nip a cleaned target with a brush roller, a water absorption roller, an adhesive roller, a wiping roller, and the like, devices of an air blow type to blow cleaning air to a cleaned target, and devices of a type to fire a cleaned target with a laser, and combinations of these devices.

In the case of the device to nip a cleaned target with a cleaning roller, the adjustment of a belt linear speed and a roller linear speed improves the cleaning effect greatly.

<<Stretching Process>>

In the present invention, the acrylic film obtained in the above manner is stretched 1.1 (10%) to 2.5 (150%) times into at least one direction of the longitudinal direction (film conveying direction) and transverse direction (width direction) after having passed through a process at which the film comes in contact with the cooling roller.

Usually, in an optical film, the stretching process is conducted in order to improve the flatness or to adjust retardation. However, in the acrylic film of a the present invention, stretching treatment can improve saponification adaptability.

As the reason, it is presumed that the stretching treatment make a portion having high activity energy of an acrylic film to come out, and the come-out portion contributes to improve the saponification adaptability.

Accordingly, if the acrylic film is left uncontrolled in the air with a humidity of 60% RH or more, the resulting effect of the stretching treatment decreases gradually, and eventually the effect disappears. Therefore, in order to maintain the effect, it is preferable that the acrylic film is preserved under a humidity of 10% RH or more, or the acrylic film is used within 360 hours after the stretching treatment.

The stretching method may be achieved by well-known roller-stretching machines and tentor. The stretching temperature is usually adjusted within a temperature range of Tg to (Tg+50° C.), preferably Tg to (Tg+40° C.), where Tg is glass transition point of a resin constituting the film.

The stretching is conducted preferably under uniform temperature distribution controlled in the width direction. The deviation in the temperature distribution is preferably within ±2° C., more preferably within ±1° C., specifically preferably within ±0.5° C.

Further, in the stretching process, well-known heat setting conditions, cooling, and relaxation treatment may be conducted, so that the stretching process may be adjusted suitably so as to provide the target film with required characteristics.

In order to shrink the film in the lengthwise direction, for example, the widthwise stretching is made to clip-out temporarily so that the film is relaxed in the lengthwise direction, or the distance between neighboring clips in the transverse stretching device is gradually narrowed, so that the film is shrunk.

The latter method can be performed by use of a common simultaneous biaxial-stretching machine in such a way that the distance between neighboring clips in the longitudinal direction is smoothly gradually narrowed by driving of clips in accordance with a pantograph method or a linear drive method.

If required, the stretching may be combined with a stretching in an arbitrary direction (oblique direction). The shrinkage of 0.5% to 10% in both the lengthwise direction and widthwise direction may minimize the dimension change ratio of the acrylic film.

Further, since the elastic modulus of a film can be raised by stretching, the stretching is effective as a means for supplementing the lowness of the elastic modulus of the acrylic film produced by the melt casting.

The stretching can be performed in the lengthwise direction of an acrylic film and sequentially or simultaneous in the direction perpendicular to the lengthwise direction in the in-plane of the acrylic film, that is, in width direction.

Thickness fluctuation of an acrylic film obtained can be decreased by stretching the film into two axial directions perpendicular to each other. Excessive large thickness fluctuation of an acrylic film causes unevenness of retardation. If the film is used in a liquid crystal display, there may be problems of unevenness such as coloring.

The thickness fluctuations of an acrylic film is desirably ±3%, and more desirably in a range of ±1%.

After the stretching process, the side end portions of an acrylic film are slit by a slitter so that the acrylic film has a width of a product. Thereafter, the both end portions of the acrylic film are subjected to knurl processing (emboss processing) by a knurl processing apparatus composed of an emboss ring and a back roll. Then, when the acrylic film is wound up by a winding apparatus, sticking and scratch of the acrylic film wound up in a roll form can be prevented by emboss provided on the acrylic film. The knurl processing can be achieved such that a metal ring which has convex-concave patter on its side surface is heated and pressed onto the both end portions of an acrylic film.

Both end portions of the acrylic film slit out by the slitter may be recycled as a raw material.

Next, in the winding-up process, an acrylic film is wound up around a winding-up roller while maintaining a constant shortest distance between the outer peripheral surface of the cylinder-shaped wound-up acrylic film and the outer peripheral surface of a mobile conveyance roller located at a position just before the wound-up acrylic film. Further, at a position just before the wound-up acrylic film, provided is a electric charge eliminating blower to reduce or eliminate the surface electric potential of the acrylic film.

The winding-up machine relating to the manufacture of the acrylic film of the present invention may be a machine used generally, and can wind a film by winding methods, such as a constant tension method, a constant torque method, a taper tension method, and a program tension controlling method with a constant internal stress. It is desirable that the initial winding-up tension at the time of winding up of an acrylic film is 90.2-300.8 N/m.

Further, in the winding-up process of an acrylic film in the method of the present invention, it is desirable to wound up the acrylic film under the environmental condition of a temperature of 20 to 30° C. and a humidity of 20 to 60% RH. When the temperature in the winding-up process of an acrylic film is in a range of 20 to 30° C., wrinkles does not occur, and the quality of a roll of an acrylic film does not deteriorate. Moreover, when the humidity in the winding-up process of an acrylic film is in a range of 20 to 60% RH, quality degradation of a roll of an acrylic film by moisture absorption is also reduced, a roll is excellent in quality, sticking trouble does not occur, and conveyance adaptability does not deteriorate.

A core at the time of winding-up of an acrylic film in a roll form may be made of material of any kind as long as it is a cylindrical core, and is preferably a hollow plastic core. A plastic material may be any one as long as it is a heat-resistant plastic which endures heat processing temperature, and examples of the plastic material include resins, such as a phenol resin, a xylene resin, a melamine resin, a polyester resin, and an epoxy resin.

Moreover, a heat curable resin strengthened with fillers, such as glass fiber, is desirable. For example, a hollow plastic core: made of FRP with an outer diameter of 6 inches (hereafter, 1 inch is equal to 2.54 cm) and an inner diameter of 5 inches may be preferably used.

In the manufacture of the acrylic film of the present invention, in consideration of productivity and conveyance adaptability, the length of a roll preferably 10 to 5000 m, and more preferably 50 to 4500 m.

At this time, the width of an acrylic film may be selected to a width suitable for the width of a polarizer and the production line. However, the width may be 0.5 to 4.0 m, and preferably 1.0 to 3.0 m, and it is desirable to manufacture and wind up an acrylic film with a such width.

A haze value (turbidity) may be used as an index to judge the transparency of an acrylic film in the present invention. In the liquid crystal display used particularly on the outdoors, since sufficient luminance and high contrast are required even at a bright location, a haze value is needed to be 0.5% or less, and more desirable to be 0.35% or less.

The acrylic film of the present invention has preferably the total light transmittance of 90% or more, and more preferably 92% or more. In order to attain such excellent transparency expressed with the above total light transmittance, it is effective not to introduce additives which absorbs visible light and a copolymerization component, and to reduce diffusion and absorption of light at an inside of a film by removal of foreign matter in a polymer via high precision filtration.

Moreover, diffusion and reflection of light on a film surface may be effectively reduced by minifying the surface roughness on film contacting portions (cooling roller, calendar roller, drum, belt, a coating substrate at the time of production of film so as to minify the surface roughness on the surface of film, or by minifying the refractive index of an acrylic resin.

There is no restraint specifically in the thickness of the acrylic film of the present invention. However, when the acrylic film is used for a polarizing plate protective film mentioned later, the thickness of the acrylic film is desirably 20 to 200 μm, more desirably 25 to 100 μm, and particularly desirably 30 to 80 μm.

Since the acrylic film of the present invention is produced by the melting casting film producing method, when the acrylic film is wound up into a roll-shaped film, the content of solvents is 0.01% by weight or less. The content of solvent can be measured by the following procedures.

Into a closed glass container, 20 ml of each sample is put, and processed under the following head space heating condition. The content of solvent in each sample is measured based on a calibration curve prepared beforehand for the used solvent by the following gas chromatography. The content of solvent is expressed by pats by weight for the entire weight of an acrylic film.

Instrument: 5890SERIES II by H.P. company
Column: DB-WAX (inner diameter: 0.32 mm, length: 30 m in die length) by J&W Corporation
Detection: FID
GC temperature rising condition: After holding for 5 minutes at 40° C., the temperature is raised up to 100° C. at a rate of 80° C./min.
Head-space heating condition: 20 min at 120° C.

(Solution Casting Film Producing Method)

Hereafter, a solution casting film producing method will be described.

(Organic Solvent)

When the acrylic resin containing film of the present invention is produced via the solution casting method, as useful organic solvents to form a dope, any solvent may be employed without limitation as long as it simultaneously dissolves acrylic resin, cellulose ester resin, and other additives.

Examples thereof may include, chlorine type organic solvents, such as methylene chloride, and non-chlorine type organic solvents such as methyl acetate, ethyl acetate, amyl acetate, acetone, tetrahydrofuran, 1,3-dioxolane, 1,4-dioxane, cyclohexanone, ethyl formate, 2,2,2-trifluoroethanol, 2,2,3,3-hexafluoro-1-propanol, 1,3-difluoro-2-propanol, 1,1,1,3,3,-hexafluoro-2-methyl-2-propanol, 1,1,1,3,3,3-hexafluoro-2-propanol, 2,2,3,3,3-pentafluoro-1-propanol and nitroethane. Methylene chloride, methyl acetate, ethyl acetate and acetone are preferably employable.

It is preferable that other than the above organic solvents, incorporated in the dope, are aliphatic alcohols having a straight or branched chain having 1 to 4 carbon atoms in an amount of 1 to 40% by weight. As the alcohol ratio in the dope increases, the resulting web is gelled, whereby peeling from a metal support become easier. Further, as the ratio of alcohol is low, it enhances dissolution of acrylic resin (A) and cellulose ester resin (B) in non-chlorine type organic solvents.

Specifically, a dope composition is preferred which is prepared by dissolving, in solvents incorporating methylene chloride and aliphatic alcohols having a straight or branched chain having 1 to 4 carbon atoms, three of acrylic resin (A), cellulose ester resin (B), and acrylic particles (C) in an total amount of 15 to 45% by weight.

As aliphatic alcohols having a straight or branched chain having 1 to 4 carbon atoms, listed may be methanol ethanol, n-propanol, iso-propanol, n-butanol, sec-butanol, and tert-butanol. Ethanol is preferable among these in view of stability of the dope, relatively low boiling point and good drying performance.

1) Dissolution Process

A dissolution process prepares a dope in such a manner that acrylic resin (A) and cellulose ester resin (B), and in some cases, acrylic particles (C) and other additives are dissolved, while stirring, in organic solvents mainly composed of good solvents for above acrylic resin (A) and cellulose ester resin (B) employing a dissolution tank, or prepares a dope which is a major dissolution liquid by blending, in some cases, acrylic particles (C) and other additive solutions with above acrylic resin (A) and cellulose ester resin (B) solution.

It is possible to dissolve acrylic resin (A) and cellulose ester resin (B) via various dissolution methods such as: a method in which dissolution is carried out at normal pressure, a method in which dissolution is carried out at the temperature of the boiling point of the major solvent or less, a method employing any of the cooling dissolution methods described in JP-A Nos. H09-95544, H09-95557, and H09-95538, a method, described in JP-A No. H11-21379, in which dissolution is carried out under high pressure. Of these, preferred is the method in which dissolution is carried out at the temperature of at least the boiling point of the major solvent under pressure application.

The total concentration of acrylic resin (A) and cellulose ester resin (B) in a dope is preferably in the range of 15 to 45% by weight. Additives are added to the dope during or after dissolution. After dissolution or dispersion, the resulting mixture is filtered via a filter and defoamed, followed by transfer to the next process via a solution conveying pump.

It is preferable that filtration is carried out employing a filter at a particle catching diameter of 0.5 to 5 μm and a water freeness time of 10 to 25 sec/100 ml.

In the above method, aggregates remained during particle dispersion and formed during the addition of the major dope, are only removable by employing a filter at a particle catching diameter of 0.5 to 5 μm and a water freeness time of 10 to 25 sec/100 ml. In the major dope, since particle concentration is sufficiently low compared to that of the added solution, no abrupt increase in filtering pressure due to mutual adhesion of aggregates during filtration occurs.

In many cases, the major dope occasionally incorporates return scrap in an amount of about 10 to about 50% by weight. Occasionally, the return scrap includes acrylic particles. In such a case, it is preferable to control the added amount of the acrylic particle added liquid matching to that of the added amount of the return scrap.

The content of acrylic particles in the acrylic particle-containing addition solution is preferably 0.5 to 10% by weight, is more preferably 1 to 10% by weight, but is most preferably 1 to 5% by weight.

The above addition range is preferred since the added solution is easily handled due to its low viscosity, and is easily added to the major dope.

"Return scrap", as described herein, refer to ones which are produced by finely pulverizing acrylic resin containing films. Available ones include trimmed portions of film of both edges formed during production of acrylic resin containing film and mill rolls which are not within the specifications, for example, due to the presence of abrasion defects.

Further, it is possible to preferably employ pellets which are prepared by kneading acrylic resins and cellulose ester resins, and possibly acrylic particles, followed by pellet formation.

2) Casting Process

A casting process is one in which dope is transferred to pressurized die 30 via a solution sending pump (for example, a pressurized type quantitative gear pump) and is cast from the pressurized die slit onto the casting position on continuously moving looped metal belt 31 such as a stainless steel belt, or a rotating metal drum.

A pressurized die is preferred in which the slit shape of the discharge portion of the die can be regulated to easily make the film thickness uniform. Pressurized dies include a coat hanger die and a T die, and any of these are preferably employed. The surface of metal supports is finished to be specular. In order to increase the film production rate, a multilayer may be realized in such a manner that at least two pressurized dies are provided on the metal support and the dope is divided into several portions. Alternately, it is also preferable to prepare a laminated structure film via a co-casting method in which a plurality of divided dope portions is simultaneously cast.

3) Solvent Evaporating Process

A solvent evaporating process is one in which a web (namely, a dope is cast onto a casting support and the resulting dope film is called a web) is heated on the casting support, whereby solvents evaporate.

Solvents are evaporated via a method in which air is blown from the web side and/or a method in which heat is transmitted via a liquid from the reverse side, and a method in which heat is transmitted via radiant heat from both the front and reverse surfaces. Of these, the reverse surface liquid heat transmission method is preferred since higher drying efficiency is realized. Further, preferably employed are combinations of these methods. It is preferable that the web, on the support after casting, is dried on the support under an ambience of 40 to 100° C. In order to maintain the ambience of 40 to 100° C., it is preferable that airflow at the above temperature impinges the upper surface of the web, or heating is carried out via means such as infrared rays.

In view of surface quality, hygroscopicity, and peeling properties, the above web is peeled from the web within 30 to 120 seconds.

4) Peeling Process

A peeling process is one in which a web, from which solvents have been evaporated on the metal support, is peeled in a predetermined peeling position. The peeled web is conveyed to the following process.

Temperature in the peeling position on the metal support is preferably 10 to 40° C., but is more preferably 11 to 30° C.

The residual solvent amount while peeled in the web on the metal support is preferably in the range of 50 to 120% by weight in view of drying conditions and the length of the metal support. When peeled in the presence of a relatively large amount of residual solvents, the web is excessively soft, whereby flatness is deteriorated to tend to form wrinkles and longitudinal streaks caused by peeling tension. Consequently, the amount of residual solvents in the peeling position is determined via compatibility between an economical speed and quality.

The residual solvent amount in a web is defined by the following formula

Residual solvent amount(%)=(weight of a web prior to a heat treatment−weight of the web after the heat treatment)×100

Heat treatment during determination of the residual solvent amount refers to one carried out at 115° C. for one hour.

Peeling tension during peeling of film from the metal support is usually 196 to 245 N/m. However, when wrinkles tend to result, it is preferable that peeling is carried out under a tension of 190 N/m or less. Further, during peeling, the lowest peeling tension is preferably 166.6 N or less, is more preferably 137.2 N/m or less, but is most preferably 100 N/m or less.

In the present invention, temperature in the peeling position on the above metal support is preferably regulated to −50 to 40° C., more preferably to 10 to 40° C., but most preferably to 15 to 30° C.

5) Drying and Stretching Processes

After peeling, the web is dried employing dryer in which the web is alternately passed through a plurality of rollers installed in the web dryer and/or tenter stretching apparatus 34 which conveys a web while clipping both edges of the web.

In common drying means, heated air is blown onto both sides of the web. Means are also available in which heating is carried out via application of microwaves instead of air flow. Excessively rapid drying tends to deteriorate flatness of the finished film. High temperature drying is preferably carried out when the residual solvents reaches 8% by weight. Throughout the entire process, drying is carried out between about 40 to about 250° C., but is preferably carried out specifically between 40 to 160° C.

When a tenter stretching apparatus is employed, it is preferable to employ an apparatus which enables independent control of the film holding length (the distance from the holding initiation to the holding termination) at the right and the left. Further, during the tentering process, to improve flatness, it is preferable to intentionally provide zones which differ in temperature.

Further, it is also preferable to provide a neutral zone between temperature different zones so that adjacent zones result in no interference.

When tentering is carried out, the residual solvent amount in a web is preferably 20 to 100% by weight at the initiation of tentering. It is preferable that until the residual solvents in the web reaches 10% by weight or less, drying is carried out while tentering. The above residual solvents in the web is more preferably 5% by weight or less.

Drying temperature during tentering is preferably 30 to 160° C., is more preferably 50 to 150° C., but is most preferably 70 to 140° C.

During the tentering process, in view of enhancement of film uniformity, it is preferable that temperature distribution in the lateral direction under any ambience is small. The temperature distribution in the lateral direction during the tentering process is preferably ±5° C., is more preferably ±2° C., but is most preferably ±1° C.

When the stretching magnification is less than 10%, saponification adaptability becomes insufficient, and when it is larger than 150%, manufacture of a film becomes difficult. The stretching magnification is preferably 15% to 50%.

6) Winding Process

A winding process is one in which, after the residual solvent amount in the web reaches 2% by weight or less, as an acrylic resin containing film (acrylic film), the resulting web is wound by winder 37. By realizing the residual solvent amount to be 0.4% by weight, it is possible to prepare a film which exhibits excellent dimensional stability.

Usually employed methods may be employed as a winding method, and include a constant torque method, a constant tension method, a tapered tension method, and an internal stress constant program tension control method. Any of these may be appropriately selected and employed.

If the acrylic film of the present invention satisfies the above physical properties, the acrylic film may be particularly preferably be used as a polarizing plate protective film of a large-sized liquid crystal display and a liquid crystal display for use in an outdoor application.

<Production Method of a Polarizing Plate>

When the acrylic film of the present invention is used as a protective film for a polarizing plate, the polarizing plate may be produced by a method which makes a common cellulose ester as a polarizing plate protective film. That is, the acrylic film of the present invention is subjected to saponification treatment, and then is passed on a polarizer. At this time, a water-based adhesive may be used.

The saponification treatment is preferably conducted under the condition similar to the following conditions.

| | |
|---|---|
| Saponification process: 2 mol/L of sodium hydroxide | 50° C. 90 seconds |
| Rinsing process: Water | 30° C. 45 seconds Neutralization |
| process 10% by mass of hydrochloric acid | 30° C. 45 seconds |
| Rinsing process: Water | 30° C. 45 seconds |

After the saponification treatment, the rinsing process, the neutralization process, and the rinsing process were conducted in this order, thereafter, the acrylic film samples were dried at 80° C.

The saponification treatment is preferably conducted within 360 hours after the stretching. After this saponification treatment, the acrylic film is passed on a polarizer with a water-based adhesive.

The water-based adhesive means an adhesive containing 50% by weight of water as a solvent, and examples of the water-based adhesive include a polyvinyl alcohol type water-based adhesive, a gelatin adhesive, a vinyl type latex adhesive, a water-based polyester, and the like. Among them, a polyvinyl alcohol type water-based adhesive is especially desirable.

These are preferably used by being prepared such that the solid content is 0.5 to 30 percent by weight. Especially, in the case where a cellulose ester is used as a polarizing plate protective film, the same adhesive is desirable.

On the other side, employed may be the acrylic resin containing film of the present invention or another polarizing plate protective film. For example, preferably employed are commercial cellulose ester films (such as KONICA MINOLTA TAC KC8UX, KC4UX, KC5UX, KC8UY, KC4UY, KC12UR, KC8UCR-3, KC8UCR-4, KC8UCR-5, KC8UE, KC4UE, KC4FR-3, KC4FR-4, KC4HR-1, KC8UY-HA, and KC8UX-RHA, all produced by Konica Minolta Opto, Inc.).

A polarizer, which is a major constitutional component of the polarizing plate, is an element which transmits light in a polarized wave plane in a specific direction. The representative polarizing film, which is presently known, is a polyvinyl alcohol type polarizing film, which includes one dyed with iodine and the other which is dyed with dichroic dyes.

The employed polarizer is prepared as follows. A film is prepared employing an aqueous polyvinyl alcohol solution. The resulting film is uniaxially stretched, followed by dying, or after dying, it is uniaxially stretched, followed by an endurance enhancing treatment, by preferably employing boron compounds.

(Liquid Crystal Display Device)

By incorporating a polarizing plate, adhered together with the acrylic resin containing film of the present invention, in a liquid crystal display device, it is possible to produce a liquid crystal display device which excels in various kinds of visibility. The above polarizing plate is preferably employed specifically in large liquid crystal display devices, as well as outdoor liquid crystal display devices such as digital signage. The polarizing plate according to the present invention is adhered to liquid crystal cells via the above adhesive layer.

The polarizing plate according to the present invention is preferably employed in a reflection type, transparent type, or semi-transparent type LCD, or in various driving system LCDs such as a TN type, an STN type, an OCB type, an HAN type, a VA type (a PVA type and an MVA type), and an IPS type (including an FFS system). Specifically in a large screen display device, particularly a screen of at least 30 type, especially of 30 to 54 type, no white spots occur at the periphery of the screen and its effect is maintained over an extended duration.

EXAMPLE

<Production of a Polarizing Plate and a Liquid Crystal Display>
<Production of an Acrylic Film 1>

| (Composition of Dope liquid 1) | |
|---|---|
| DIANAL BR85 (produced by Mitsubishi Rayon Co., Ltd.): | 70 parts by weight |
| Cellulose acetate propionate: (a total substitution degree of an acyl group of 2.7, a substitution degree of an acetyl group of 0.19, a substitution degree of a propionyl group of 2.56, and Mw of 200,000) | 30 parts by weight |
| Polyhydric alcohol fatty acid ester S1: | 0.5 parts by weight |
| Methylene chloride | 300 parts by weight |
| Ethanol | 40 parts by weight |

The above compositions were dissolved while being heated, whereby Dope liquid 1 was prepared.

The dope liquid, prepared as above, was uniformly cast onto a 2 m wide stainless steel band support at 22° C., employing a belt casting apparatus. Solvents were evaporated on the stainless steel band support so that the residual solvent amount reached 100%, and the resulting film was peeled from the stainless steel band via a peeling tension of 162 N/m.

The peeled acrylic resin web was heated at 35° C. to evaporate solvents and was slit to a 1.6 in width. Thereafter, while being stretched by a factor of 1.1 in the lateral direction via a tenter, drying was carried out carried out at a drying temperature of 135° C. When stretching was initiated via the tenter, the amount of residual solvents was 10%.

After tenter stretching, relaxation was allowed out for 5 minutes at 130° C. Thereafter, drying was completed via conveyance into 120° C. and 140° C. drying zones employing numerous rollers, and slitting was carried out for a 1.5 m width. Subsequently, a knurling treatment of a width of 10 mm and a height of 5 µm was applied to both edges, followed by winding onto a core of an internal diameter of 15.24 cm under an initial tension of 220 N/m and a final tension of 110 N/m, whereby Acrylic Film 1 was prepared.

Hereafter, film samples were prepared in the same way as that in Acrylic Film 1 except that materials were changed as shown in Table 1.
(Polyhydric Alcohol Fatty Acid Ester)
S1: Glycerol monostearate
S2: Diglycerol monostearate
S3: SPAN60 (manufacture by Kanto Kagaku)
S4: TWEEN60 (manufacture by Kanto Kagaku)
(Acrylic Resin)
A1: monomer weight ratio (MMA:MA=98:2), Mw 75,000
A2: monomer weight ratio (MMA:MA=97:3), Mw 120,000
A3: monomer weight ratio (MMA:MA=97:3), Mw 140,000
A4: monomer weight ratio (MMA:MA=97:3), Mw 550,000
A5: monomer weight ratio (MMA:MA=97:3), Mw 950,000
A6: monomer weight ratio (MMA:MA=97:3), Mw 1100,000
MS1: monomer weight ratio (MMA:ST=60:40), Mw 100,000

MS2: monomer weight ratio (MMA:ST=40:60), Mw 100,000
MMA: methyl methacrylate
MA: methyl acrylate
ST: styrene
DIANAL BR85 (produced by Mitsubishi Rayon Co., Ltd.), Mw 280,000
DIANAL BR88 (produced by Mitsubishi Rayon Co., Ltd.), Mw 480,000

The ratio of MMA units in molecules in each of the above-mentioned commercially-available acrylic resins is 90% by weight or more and 90% by weight or less.

thereafter were evaluated in the following manners. In the evaluation, "fracture" means that a film strip sample was broken into two or more pieces.
A: The film strip did not fracture at each of the three times.
C: The film strip fractured at least one time of the three times.

<Production of a Polarizing Plate>
The acrylic film samples shown in Table 1 were subjected to the following saponification treatment.
That is, the acrylic film samples except Sample Nos. 30 to 32 were first subjected to stretching processing, and then 24 hours later, subjected to the saponification treatment. On the

TABLE 1

| Acrylic film No. | Acrylic resin (A) Kind | Acrylic resin (A) Mw | Cellulose ester resin (B) Degree of substitution Ac | Cellulose ester resin (B) Degree of substitution Pr | Cellulose ester resin (B) Total degree of substitution | Cellulose ester resin (B) Mw | Composition ratio (parts by weight) (A/B) | Polyhydric alcohol Kind | Polyhydric alcohol Parts by weight | Stretching magnification (%) | Remarks |
|---|---|---|---|---|---|---|---|---|---|---|---|
| 1 | BR85 | 280000 | 0.20 | 2.55 | 2.75 | 200000 | 70/30 | S1 | 0.5 | 15 | Invention |
| 2 | BR85 | 280000 | 0.20 | 2.55 | 2.75 | 200000 | 70/30 | — | — | 15 | Invention |
| 3 | BR85 | 280000 | 0.20 | 2.55 | 2.75 | 200000 | 60/40 | — | — | 30 | Invention |
| 4 | BR85 | 280000 | 0.20 | 2.55 | 2.75 | 200000 | 50/50 | — | — | 25 | Comparative Example |
| 5 | BR85 | 280000 | 0.20 | 2.55 | 2.75 | 200000 | 25/75 | — | — | 20 | Comparative Example |
| 6 | BR85 | 280000 | 0.20 | 2.55 | 2.75 | 200000 | 80/20 | S3 | 1.5 | 30 | Invention |
| 7 | BR85 | 280000 | 0.20 | 2.55 | 2.75 | 200000 | 90/10 | S3 | 1.5 | 35 | Comparative Example |
| 8 | BR85 | 280000 | 0.20 | 2.55 | 2.75 | 200000 | 70/30 | — | — | 50 | Invention |
| 9 | BR85 | 280000 | 0.20 | 2.55 | 2.75 | 200000 | 70/30 | S3 | 1.5 | 5 | Comparative Example |
| 10 | BR88 | 480000 | 0.20 | 2.55 | 2.75 | 200000 | 70/30 | S2 | 1.0 | 15 | Invention |
| 11 | A2 | 120000 | 0.20 | 2.55 | 2.75 | 200000 | 70/30 | S4 | 1.0 | 26 | Invention |
| 12 | A3 | 140000 | 0.20 | 2.55 | 2.75 | 200000 | 70/30 | S4 | 1.0 | 26 | Invention |
| 13 | A4 | 550000 | 0.20 | 2.55 | 2.75 | 200000 | 70/30 | S4 | 1.0 | 26 | Invention |
| 14 | A5 | 950000 | 0.20 | 2.55 | 2.75 | 200000 | 70/30 | S4 | 1.0 | 26 | Invention |
| 15 | A6 | 1100000 | 0.20 | 2.55 | 2.75 | 200000 | 70/30 | S4 | 1.0 | 26 | Invention |
| 16 | A1 | 75000 | 0.20 | 2.55 | 2.75 | 200000 | 70/30 | S4 | 1.0 | 26 | Invention |
| 17 | MS1 | 100000 | 0.20 | 2.55 | 2.75 | 200000 | 70/30 | S3 | 1.5 | 30 | Invention |
| 18 | MS2 | 100000 | 0.20 | 2.55 | 2.75 | 200000 | 70/30 | S3 | 1.5 | 30 | Invention |
| 19 | BR85 | 280000 | 0.20 | 1.85 | 2.05 | 200000 | 60/40 | S3 | 1.0 | 26 | Invention |
| 20 | BR85 | 280000 | 1.30 | 1.25 | 2.55 | 200000 | 60/40 | S3 | 1.0 | 26 | Invention |
| 21 | BR85 | 280000 | 0.10 | 2.89 | 2.99 | 200000 | 60/40 | S3 | 1.0 | 26 | Invention |
| 22 | BR85 | 280000 | 0.20 | 1.70 | 1.90 | 200000 | 60/40 | S3 | 1.0 | 26 | Invention |
| 23 | BR85 | 280000 | 1.40 | 1.10 | 2.50 | 200000 | 60/40 | S3 | 1.0 | 26 | Invention |
| 24 | BR85 | 280000 | 0.20 | 2.55 | 2.75 | 120000 | 60/40 | S3 | 1.0 | 26 | Invention |
| 25 | BR85 | 280000 | 0.20 | 2.55 | 2.75 | 80000 | 60/40 | S3 | 1.0 | 26 | Invention |
| 26 | BR85 | 280000 | 0.20 | 2.55 | 2.75 | 200000 | 70/30 | S1 | 6.0 | 15 | Invention |
| 27 | BR85 | 280000 | 0.20 | 2.55 | 2.75 | 200000 | 70/30 | S1 | 0.05 | 15 | Invention |
| 28 | BR85 | 280000 | 0.20 | 2.55 | 2.75 | 200000 | 70/30 | — | — | 0 | Comparative Example |
| 29 | BR85 | 280000 | 0.20 | 2.55 | 2.75 | 200000 | 70/30 | S1 | 0.5 | 0 | Comparative Example |
| 30 | BR85 | 280000 | 0.20 | 2.55 | 2.75 | 200000 | 70/30 | S1 | 0.5 | 15 | Invention |
| 31 | BR85 | 280000 | 0.20 | 2.55 | 2.75 | 200000 | 70/30 | S1 | 0.5 | 15 | Invention |
| 32 | BR85 | 280000 | 0.20 | 2.55 | 2.75 | 200000 | 70/30 | S1 | 0.5 | 15 | Invention |

The acrylic film samples listed in Table 1 were evaluated in terms of the following items.
(Haze)
The acrylic film samples were subjected to moisture conditioning for 24 hours under the condition of 23° C., 55% RH in an air conditioning room, thereafter subjected to measurement of Haze under the above condition by use of a haze meter (NDH 2000 type, manufactured by Nippon Denshoku Industries Co., Ltd.) in accordance with JIS K 7136.
(Ductile Fracture)
The acrylic film samples were subjected to moisture conditioning for 24 hours under the condition of 23° C., 55% RH in an air conditioning room, and were cut respectively into film strip samples with a size of 100 mm (length)×10 mm (width). The resulting film strip samples were subjected sequentially mountain folding and then valley folding for three times respectively in such a way that the surfaces folded in the valley folding come in contact with each other, and other hand, 100 hour later for Sample No. 30, 240 hour later for Sample No. 30, and 400 hour later for Sample No. 32, the saponification treatment was conducted respectively.

| (Alkali saponification treatment) | | |
|---|---|---|
| Saponification process: 2 mol/L of sodium hydroxide | 50° C. | 90 seconds |
| Rinsing process: Water | 30° C. | 45 seconds |
| Neutralization process 10% by mass of hydrochloric acid | 30° C. | 45 seconds |
| Rinsing process: Water | 30° C. | 45 seconds |

After the saponification treatment, the rinsing process, the neutralization process, and the rinsing process were conducted in this order, thereafter, the acrylic film samples were dried at 80° C.

<Production of a Polarizer and Pasting>

A long roll polyvinyl alcohol film with a thickness of 120 μm was immersed in 100 parts by weight of an aqueous solution containing 1 part by weigh of iodine and 4 parts by weigh of boric acid, thereafter, the polyvinyl alcohol film was stretched in the film producing direction by 6 times at 50° C., whereby a polarizer was produced.

Next, Acrylic film sample No. 1 was pasted on one side of the polarizer with a polyvinyl alcohol type water-based adhesive (2.5% by weight solution) such that the transmission axis of the polarizer was made in parallel to the in-plane slow axis of the acrylic film, and then on the opposite side of the polarizer, a film of Konica Minolta TAC KC4UY, which was subjected to the saponification treatment in the same way, was pasted, whereby Polarizing plate 1 was produced.

In the same way, Polarizing plates shown in Table 2 were produced by use of Acrylic film samples listed in Table 1.

These Polarizing plates were evaluated in terms of the following points by the following procedures.

(Cutting Property)

The Polarizing plates were subjected to moisture conditioning for 24 hours under the condition of 23° C., 55% RH in an air conditioning room, and were torn by use of a light load (Elmendorf) tearing tester (produced by Toyo Seiki Seisakusho, Ltd.), and were evaluated based on the following criteria.
A: the torn plane was very smooth, and straightly torn.
B: the torn plane was slightly rough, however straightly torn.
C: the torn planer was very rough, and not straightly torn.

<Polarizer Adhesiveness>

The adhesiveness of the produced polarizing plate was evaluated based on the following criteria.

Each polarizing plate was cut into a size of 5 cm×7 cm. The resultant cut-out sample slip was pasted temporarily at the central portion of a glass plate with a size of 6 cm×8 cm with an acrylic adhesive. Then, these slip and plate were pressed so as to eliminate air bubbles between the cut-out sample slip and the glass plate, whereby each cut-out sample slip was pasted onto the glass plate.

In this way, the thus-obtained test pieces were fixed so as not to overlap with each other on a vertically-arranged supporting frame in a constant temperature and humidity oven set to 80° C. 95% RH and kept for 1000 hours. Thereafter, the adhesiveness between the polarizer and the acrylic film was measured for each test piece.

Evaluation of the adhesiveness between the polarizer and the acrylic film: After the high temperature and high humidity processing, a peeling-off state between the polarizer and the protective film was evaluated by visual observation.

Evaluation Criterion:
A: A film float-up portion was not observed at all.
B: A film float-up portion existed in a range of 1 to 5 mm on peripheral regions.
C: A film float-up portion existed 5 mm or more on peripheral regions.

<Production of a Liquid Crystal Display>

The display characteristic of the acrylic film of the present invention was evaluated by use of the above-produced polarizing plates.

In a liquid crystal television Wooo W32-L7000, manufactured by Hitachi, being a transverse electric field mode type liquid crystal display device, the built-in polarizing plates previously pasted on both sides were removed, and the above-produced polarizing plates were pasted respectively on the surface of the glass of the liquid cell.

The above-produced polarizing plates were pasted so as to prepare respective liquid crystal display devices in such a way that KC4UY was located at the outside for the surface of a glass plate of a liquid crystal cell and an absorption axis was orientated in the same direction as that of the preliminarily-pasted polarizing plate.

<Viewing Angle Fluctuation>

The above-prepared liquid crystal display device was evaluated as follows.

The viewing angles of liquid crystal display devices were measured by using ELDIM EZ-Contrast 160D under an environment of 23° C. and 55% RH.

Subsequently, the above polarizing plates were processed under an environment of 60° C. and 90% RH for 1000 hours, and then the viewing angles of liquid crystal display devices were measured in the same way. The measurement results were evaluated with three ranks based on the following criteria.
A: No viewing angle fluctuation was observed
B: Viewing angle fluctuation was observed
C: Excessively large viewing angle fluctuation was observed (Color Shift)

The display was made to a black indication mode and was observed obliquely with angles of 45 degrees. At this observation, a color change was evaluated under the environment of 23° C., 55% RH based on the following criteria.
A: No color change was observed
B: Color change was observed
C: Color change was extremely large.

The results of the above evaluation are shown in Table 2.

TABLE 2

| Acrylic film No. | Optical film evaluation | | Polarizing plate evaluation | | Liquid crystal display evaluation | | Remarks |
| | Haze (%) | Ductile fracture | Polarizer adhesiveness (N) | Polarizing plate cutting property | Viewing angle fluctuation | Color shift | |
| --- | --- | --- | --- | --- | --- | --- | --- |
| 1 | 0.24 | A | A | A | A | A | Invention |
| 2 | 0.26 | A | B | A | A | A | Invention |
| 3 | 0.33 | A | A | A | A | A | Invention |
| 4 | 0.40 | A | A | A | C | C | Comparative example. |
| 5 | 0.76 | A | A | B | C | C | Comparative example. |
| 6 | 0.27 | A | B | B | B | A | Invention |
| 7 | 0.28 | C | C | C | C | C | Comparative example. |
| 8 | 0.45 | A | B | B | A | A | Invention |
| 9 | 0.27 | A | C | B | C | C | Comparative example. |

TABLE 2-continued

|  | Optical film evaluation | | Polarizing plate evaluation | | Liquid crystal display evaluation | | |
|---|---|---|---|---|---|---|---|
| Acrylic film No. | Haze (%) | Ductile fracture | Polarizer adhesiveness (N) | Polarizing plate cutting property | Viewing angle fluctuation | Color shift | Remarks |
| 10 | 0.32 | A | B | A | A | A | Invention |
| 11 | 0.23 | A | A | B | A | B | Invention |
| 12 | 0.24 | A | A | A | A | A | Invention |
| 13 | 0.37 | A | A | A | A | A | Invention |
| 14 | 0.73 | A | A | A | A | A | Invention |
| 15 | 1.20 | A | B | B | A | B | Invention |
| 16 | 0.24 | A | A | B | A | B | Invention |
| 17 | 0.33 | A | A | A | A | B | Invention |
| 18 | 0.43 | A | B | B | A | B | Invention |
| 19 | 0.57 | A | A | B | A | B | Invention |
| 20 | 0.35 | A | A | B | A | B | Invention |
| 21 | 0.44 | A | A | A | A | B | Invention |
| 22 | 0.77 | A | A | B | B | B | Invention |
| 23 | 0.89 | A | A | B | B | B | Invention |
| 24 | 0.36 | A | A | B | A | B | Invention |
| 25 | 0.49 | A | B | B | B | B | Invention |
| 26 | 0.62 | A | A | B | B | B | Invention |
| 27 | 0.25 | A | B | A | A | A | Invention |
| 28 | 0.24 | A | C | C | C | C | Comparative example. |
| 29 | 0.24 | A | C | B | C | C | Comparative example. |
| 30 | 0.24 | A | A | A | A | A | Invention |
| 31 | 0.24 | A | A | A | A | A | Invention |
| 32 | 0.24 | A | B | A | A | A | Invention |

As can be seen from Table 2, it turns out that in the production method of the present invention, even if a water-based adhesive is used sufficient adhesiveness can be obtained for a polarizer.

The invention claimed is:

1. A method of producing a polarizing plate including a polarizer and two polarizing plate protective films between which the polarizer is sandwiched, comprising the steps of
stretching an acrylic film in at least one direction of a lengthwise direction and a widthwise direction by an stretching magnification of 10% to 150%;
pasting the stretched acrylic film onto one side of the polarizer as one of the two polarizing plate protective films with a water-based adhesive,
wherein the acrylic film contains an acrylic resin (A) with a weight aver ace molecular weight of 75,000 to 1,100, 000 and a cellulose resin (B) with a weight average molecular weight of 75,000 to 240,000 at a weight ratio of 0020 to 60:40.

2. The method described in claim 1, wherein the acrylic film contains a polyhydric alcohol fatty acid ester in an amount of 0.1 to 10 percent by weight to the total weight of the acrylic film.

3. The method described in claim 1, wherein the water-base adhesive is one of a polyvinyl alcohol type water-based adhesive, a gelatin adhesive, in vinyl type latex adhesive, and a water-based polyester.

4. The method described in claim 1, wherein the cellulose resin (B) has a substitution degree of an acyl group in a range of 2.0 to 3.0.

5. The method described in claim 1, wherein the cellulose resin (B) has a substitution degree of an acyl group with 3 to 7 carbon atoms in a range of 1.2 to 3.0.

6. The method described in claim 1, wherein the acrylic film contains acrylic particles.

7. The method described in claim 1, wherein the pasting step includes a saponification treatment.

8. The method described in claim 7, wherein the saponification treatment for the stretched acrylic film is conducted within 360 hours after the stretching step.

9. The method described in claim 1, wherein the stretched acrylic film is pasted in such a way that a transmission axis of the polarizer is made in parallel to an in-plane slow axis of the acrylic film.

10. The method described in claim 1, wherein the stretching magnification is 15% to 50%.

* * * * *